United States Patent
Hayasaka et al.

(10) Patent No.: US 9,104,328 B2
(45) Date of Patent: Aug. 11, 2015

(54) STORAGE APPARATUS AND METHOD FOR CONTROLLING STORAGE APPARATUS

(71) Applicants: Hitachi, Ltd., Tokyo (JP); Hitachi Computer Peripherals Co., Ltd., Kanagawa (JP)

(72) Inventors: Mitsuo Hayasaka, Ota-ku (JP); Koji Yamasaki, Isogo-ku (KP)

(73) Assignees: HITACHI, LTD., Tokyo (JP); HITACHI INFORMATION & TELECOMMUNICATION ENGINEERING, LTD., Kanagawa (JP)

( * ) Notice: Subject to any disclaimer, the term of this patent is extended or adjusted under 35 U.S.C. 154(b) by 275 days.

(21) Appl. No.: 13/697,830

(22) PCT Filed: Oct. 31, 2012

(86) PCT No.: PCT/JP2012/006984
§ 371 (c)(1),
(2) Date: Jan. 17, 2013

(87) PCT Pub. No.: WO2014/068617
PCT Pub. Date: May 8, 2014

(65) Prior Publication Data
US 2014/0122818 A1     May 1, 2014

(51) Int. Cl.
*G06F 7/53* (2006.01)
*G06F 13/378* (2006.01)
*G06F 13/20* (2006.01)
*G06F 3/06* (2006.01)
*G06F 17/30* (2006.01)

(52) U.S. Cl.
CPC .............. *G06F 3/0641* (2013.01); *G06F 3/067* (2013.01); *G06F 3/0619* (2013.01); *G06F 17/30156* (2013.01)

(58) Field of Classification Search
CPC .......... G06F 17/30156; G06F 11/1453; G06F 11/1451; G06F 11/1469; G06F 11/1435; G06F 17/30097; G06F 3/0641; G06F 11/2094; G06F 3/0671; G06F 17/30628; G06F 17/30952; G06F 17/30949; G06F 17/30312; G06F 17/30321; G06F 17/30613; G06F 2201/81; G06F 11/1448; G06F 17/3015
See application file for complete search history.

(56) References Cited

U.S. PATENT DOCUMENTS 8,131,924 B1 *   3/2012   Frandzel et al. ............... 711/113
8,190,835 B1 *   5/2012   Yueh .............................. 711/162
8,291,170 B1 *   10/2012   Zhang et al. .................. 711/135

(Continued)

FOREIGN PATENT DOCUMENTS

WO   2009033074 A2   3/2009
WO   2011/033582 A1   3/2011

*Primary Examiner* — Cheng-Yuan Tseng
*Assistant Examiner* — Candice Rankin
(74) *Attorney, Agent, or Firm* — Volpe and Koenig, P.C.

(57) ABSTRACT

Upon receipt of an I/O request instructing storage of data in a storage device 106 from a host apparatus, a storage apparatus 100 selects a de-duplication process method to be applied to the received data, based on at least any of influence on processing performance of the storage apparatus 100 to be performed by execution of a first de-duplication process method (inline method) in which the de-duplication process is performed on the data immediately after the receipt of the I/O request, influence on the processing performance of the storage apparatus 100 to be performed by execution of a second de-duplication process method (post-process method) in which the de-duplication process is performed on the data at later timing, and the size of a temporary storage device 106b to be required for the processing of the data by the second de-duplication process method.

20 Claims, 21 Drawing Sheets

(56) References Cited

U.S. PATENT DOCUMENTS

| | | |
|---|---|---|
| 2009/0259701 A1 | 10/2009 | Wideman et al. |
| 2011/0022718 A1* | 1/2011 | Evans et al. ................... 709/231 |
| 2011/0184909 A1 | 7/2011 | Slater et al. |
| 2011/0191305 A1* | 8/2011 | Nakamura et al. ............ 707/692 |
| 2011/0276744 A1* | 11/2011 | Sengupta et al. .............. 711/103 |
| 2014/0114932 A1* | 4/2014 | Mallaiah et al. ............... 707/692 |

* cited by examiner

Fig. 6

CONTENT INDEX TABLE S164

| CONTENT ID 361 | FINGER PRINT 362 | CONTAINER ID 364 | CONTENT OFFSET 366 | CHUNK LENGTH 368 | |
|---|---|---|---|---|---|
| $f_1$ | $FP_a$ | $C_f$ | offset a | length a | |
| $f_1$ | $FP_f$ | $C_c$ | offset f | length f | — $S_{f1}(202)$ |
| $f_2$ | $FP_b$ | $C_g$ | offset b | length b | |
| $f_2$ | $FP_c$ | $C_g$ | offset c | length c | — $S_{f2}(204)$ |
| $f_2$ | $FP_f$ | $C_c$ | offset f | length f | |
| $f_3$ | $FP_b$ | $C_g$ | offset b | length b | |
| $f_3$ | $FP_c$ | $C_g$ | offset c | length c | |
| $f_3$ | $FP_d$ | $C_h$ | offset d | length d | |
| $f_3$ | $FP_e$ | $C_h$ | offset e | length e | — $S_{f3}(200)$ |
| $f_3$ | $FP_f$ | $C_c$ | offset f | length f | |
| $f_n$ | TABLE $S_{fn}(360)$ | | | | |

STORAGE APPARATUS AND METHOD FOR CONTROLLING STORAGE APPARATUS

TECHNICAL FIELD

The present invention relates to a storage apparatus and a method for controlling a storage apparatus.

BACKGROUND ART

PTL 1 discloses a technology related to improvement in performance of a de-duplication process executed in a storage system. When receiving write requests from clients, the storage system executes a first de-duplication process and executes a second de-duplication process at a subsequent appropriate timing. In the first de-duplication process, the storage system determines whether or not data to be written overlaps with any piece of data already written into a storage device (data ranked high among the data ranked in order of possibility to overlap with other data). When the data is determined to overlap, the storage system prevents the write data from being written into the storage device. Moreover, the storage system performs the second de-duplication process for data not yet evaluated if the data overlaps with the data already written into the storage device in the first de-duplication process, among the write data written into the storage device. Specifically, the storage system determines whether or not the data overlaps with the other data already written into the storage device. When the data is determined to overlap, the storage system deletes the write data written into the storage device or the data having the same data as the write data from the storage device.

CITATION LIST

Patent Literature

PTL 1: International Publication No. 2011/033582 pamphlet

SUMMARY OF INVENTION

Technical Problem

In the case of the storage system disclosed in PTL 1, all the data (including both data to be de-duplicated and data not to be de-duplicated) which are not yet evaluated for de-duplication is stored in the storage device. Thus, a required capacity of the storage device is increased. Moreover, when writing of new data (data not to be de-duplicated) into the storage device and reading of data from the storage device for the second de-duplication process are simultaneously performed, access performance to the storage device is deteriorated, and the entire storage system reduces in processing performance. However, PTL 1 gives no consideration to such a case as where multiple processes are concurrently performed.

The present invention was made in view of the above circumstances, and it is an objective thereof to provide a storage apparatus and a method for controlling a storage apparatus which are capable of efficiently performing de-duplication while effectively utilizing storage resources.

Solution to Problem

One of the aspects of the present invention to achieve the foregoing object is a storage apparatus providing an external apparatus with a storage area of a storage device in response to an I/O request sent from the external apparatus, including a function to perform a de-duplication process to prevent data received with the I/O request from the external apparatus from being redundantly stored in the storage device, a function to perform a first de-duplication process method in which, upon receipt of the I/O request instructing storage of data in the storage device, the de-duplication process is performed on the data immediately, and a function to perform a second de-duplication process method in which, upon receipt of the I/O request instructing storage of data in the storage device, the data is temporarily stored in a predetermined storage area, and thereafter the de-duplication process is performed on the data at later timing by reading the data from the storage area, wherein, upon receipt of the I/O request instructing storage of data in the storage device, the storage apparatus selects one of the de-duplication process methods to be applied to the data based on at least any of influence on processing performance of the storage apparatus to be caused by processing the data targeted for the I/O request by the first de-duplication process method, influence on the processing performance of the storage apparatus to be caused by processing the data by the second de-duplication process method, and the size of the predetermined storage area to be required for the processing of the data by the second de-duplication process method.

Other problems disclosed in the present application and methods for solving the problems will become apparent from the following description of embodiments of the invention, description of the drawings, and the like.

Advantageous Effects of Invention

The present invention enables efficient de-duplication while effectively utilizing storage resources.

BRIEF DESCRIPTION OF DRAWINGS

FIG. 6 shows an example of a content index table S164.

DESCRIPTION OF EMBODIMENTS

Figure 1:
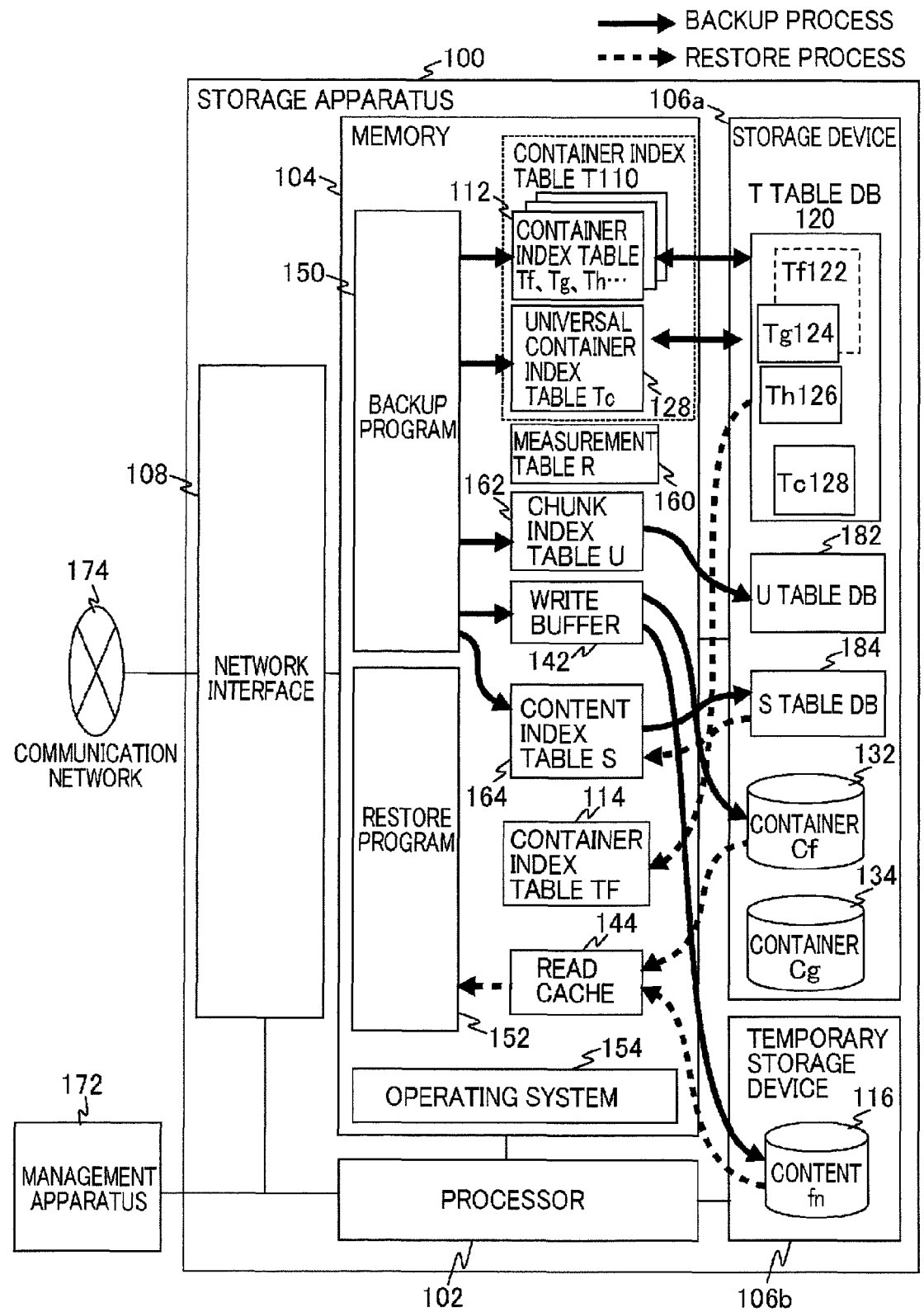
FIG. 1 is a diagram showing a configuration of a storage system.

With reference to the drawings, embodiments will be described below.

First Embodiment

A storage system described in a first embodiment includes a host apparatus (external apparatus) and a storage apparatus providing the host apparatus with a data storage area. In response to an I/O request sent from the host apparatus, the storage apparatus accesses a storage device included in the storage apparatus (or coupled to the storage apparatus), and performs I/O processing (processing related to write (hereinafter also referred to as storage) of data into the storage device and processing related to read of data from the storage device) on the storage device.

The storage device is configured using a plurality of hard disk drives, for example. Note that, in the following description, data to be written into the storage device is referred to as write data, and data read from the storage device is referred to as read data.

The storage apparatus has a file compression function and a de-duplication function as a function to effectively utilize storage resources of the storage device (a function to reduce a data amount (hereinafter also referred to as the data size) of data stored in the storage device). The file compression function is a function to reduce the data amount by reducing (coding) data having common data within one file. On the other hand, the de-duplication function is a function to prevent the same data (data having common entity data) from being redundantly stored in the storage device, and is also a function to reduce the data amount by reducing (coding) data having common data among files and then storing the reduced (coded) data in the storage device.

Methods to implement the de-duplication function described above include an inline method (a first de-duplication process method) and a post-process method (a second de-duplication process method). The storage apparatus appropriately selects one of the methods to perform the de-duplication. In the case of the de-duplication process using the post-process method, the storage apparatus once stores data received with the I/O request from the host apparatus into a dedicated device (hereinafter referred to as the temporary storage device), and then performs the de-duplication process at a later timing (asynchronously) after sending the host apparatus a response to the I/O request. On the other hand, in the case of the de-duplication process using the former inline method, the storage apparatus, upon receipt of the I/O request from the host apparatus, performs de-duplication immediately (synchronously) on the data received with the request.

The post-process method has little influence on response performance to the host apparatus from the storage apparatus, but requires a storage area of the temporary storage device to be reserved. Moreover, in the case of the post-process method, frequent accesses to the temporary storage device in the de-duplication process at later timing affect processing performance of the storage apparatus during the execution of the de-duplication process. For this reason, when write data for backup is received from the host apparatus, for example, it takes longer time to complete a backup process requested by the host apparatus.

On the other hand, the inline method requires no temporary storage device, and thus does not degrade the processing performance of the storage apparatus at later time. However, the inline method affects the response performance to the host apparatus since the de-duplication process is performed immediately after the receipt of the write data from the host apparatus. Note that, in the inline method, as to data determined to overlap with data stored in the storage device in the de-duplication process, entity data thereof is not written into the storage device. Therefore, for example, when the time required for the determination in the de-duplication process is sufficiently short, improvement in the processing performance of the storage apparatus can be expected compared with the post-process method.

As described above, the processing performance of the storage apparatus in each of the cases where the de-duplication process is performed using the inline method and where the de-duplication process is performed using the post-process method varies depending on the type of the data received from the host apparatus, the operating state of the storage apparatus, and the like. Therefore, in the present embodiment, the storage apparatus is configured to perform the de-duplication process on the write data received from the host apparatus by appropriately selecting between the inline method and the post-process method according to the characteristics of the data, the operating state of the storage apparatus, and the like. Thus, improvement in the processing performance of the storage apparatus is achieved.

Note that, in the following description, a logical set of data as a unit to be stored in the storage device is called a content. The contents include not only normal files handled by a file system but also files obtained by aggregating the normal files, such as archive files, backup files and files storing virtual volume data, for example. Note that, as to the archive files, the files aggregated therein may be regarded as individual contents.

Moreover, data of a predetermined size as a unit of de-duplication is called a chunk, while data obtained by compiling the chunks is called a container. As described later, chunks are stored in the storage device in units of containers.

To perform a de-duplication process on each chunk of the data (hereinafter referred to as the target data) received from the host apparatus, the storage apparatus determines whether or not there is a chunk (hereinafter referred to as the overlapping chunk) having the same data as (having entity data in common with) a chunk of the target data (hereinafter referred to as the target chunk) in the storage device. This determination is hereinafter also referred to as the chunk duplication determination.

When there is no chunk overlapping with the target chunk in the storage device in the chunk duplication determination, the storage apparatus writes the data (entity data) of the target chunk into the storage device. On the other hand, when there is a chunk having the same data as the target chunk in the storage device, the storage apparatus does not store the target chunk in the storage device but stores, in the storage device, information (hereinafter referred to as the link information) indicating the location, within the storage device, of the chunk having the same data as the target chunk stored in the storage device (i.e., provides a plurality of links to the same entity data).

The storage apparatus manages an index table for each container (hereinafter referred to as the container index table) as information to manage the chunks stored in the container. In the container index table, information (offset value, data size and the like) indicating the location, within the container, of each of the chunks stored in the container is stored.

The storage apparatus manages information (hereinafter referred to as the chunk index table) to identify the container index table corresponding to the target chunk. The storage apparatus generates the chunk index table at the time when the container storing chunks is determined, for example.

Methods for the chunk duplication determination include a method of comparing the chunks to each other sequentially from the first chunk (binary comparison), a method of comparing message digests, and the like. In the present embodiment, from the viewpoint of speeding up of and cost reduction in the duplication determination process, the storage apparatus performs the chunk duplication determination using the message digests.

The message digest (also called a finger print (FP)) is a digest of a fixed length generated for data of an arbitrary length. The storage apparatus generates a message digest using a hash function, for example. As the hash function, one (e.g., SHA256) that has a very high randomness and is likely to be uniquely determined for each chunk (unlikely to crash), for example, is used. In the present embodiment, the storage apparatus manages the finger print of each chunk in the container index table, and compares the finger print of the target chunk with each chunk in the container index table, thus performing the chunk duplication determination.

For each container, an upper limit of the number of chunks that can be previously stored in the container (or an upper capacity of the sum of data sizes of the chunks stored in the container) is set. In this embodiment, the chunks are held in a memory element (a memory 104 to be described later) accessible at a high speed until the container becomes full (until the container has no more space to store new chunks). Once the container becomes full, the chunks are written in the unit of containers into the storage device from the memory element.

The storage apparatus stores a chunk high in universality (hereinafter referred to as a universal chunk) among data received from the host apparatus into a container dedicated to universal chunks (hereinafter referred to as a universal container) and thereby holds the universal chunks in the memory device. In the case where the storage apparatus receives write requests related to data backup of multiple generations from the host apparatus, the storage apparatus stores, in the universal container, a chunk (universal chunk) having the same data and appearing universally in the multiple backup generations. If a universal container is resident in the memory element, the processing performance of the storage apparatus can be enhanced with reduction in the number of accesses to the storage device. In addition, universal chunks are similar to each other in each type of content (each of formats of normal file, virtual disk volume, archive file, and the like). For this reason, when the chunk duplication determination is made by each type of content, whether a chunk is a universal chunk or not can be determined efficiently.

FIG. 1 shows a configuration of a storage system to be described as an embodiment. As shown in FIG. 1, a storage apparatus 100 is coupled to a communication network 174. The storage apparatus 100 communicates with a host apparatus (not shown) via the communication network 174. The host apparatus is an information processor (computer) such as a backup server, for example.

The communication network 174 coupling the host apparatus with the storage apparatus 100 is a LAN (Local Area Network), a WAN (Wide Area Network), a SAN (Storage Area Network), the Internet, a public telecommunication network, a dedicated line or the like, for example. The communication via the communication network 174 is performed according to TCP/IP, iSCSI (internet Small Computer System Interface), fiber channel protocol or the like, for example.

As shown in FIG. 1, a management apparatus 172 is coupled to the storage apparatus 100 through a suitable communication device (LAN, USB (Universal Serial Bus) and the like). The management apparatus 172 is an information processor (computer) including output devices such as a CPU, a memory and a display, and an input device such as a keyboard, for example. The management apparatus 172 configures various settings for the storage apparatus 100 (setting of configuration information and setting concerning operations (settings for a backup process, a restore process and the like)), gives various control instructions (such as start/end control instructions) to the storage apparatus 100, collects various kinds of information from the storage apparatus 100 (such as monitoring an operational situation and collecting an operation log/failure log), and the like. The management apparatus 172 provides an administrator or an operator with a user interface (CLI (Command Line Interface), GUI (Graphical User Interface) or the like) to configure the settings or give such control instructions.

As shown in FIG. 1, the storage apparatus 100 includes a processor 102, the memory 104, a storage device 106 (a storage device 106a and a temporary storage device 106b) and a network interface 108. Note that there is a disk array apparatus as a typical example of the storage apparatus 100.

The processor 102 functions as an arithmetic processor, and contributes to the realization of various functions of the storage apparatus 100 according to programs and parameters stored in the memory 104. The memory 104 is a semiconductor storage device (such as an SRAM (Static Random Access Memory), a DRAM (Dynamic Random Access Memory), a PROM (Programmable ROM) or an NVRAM (Non Volatile RAM)), for example.

As shown in FIG. 1, programs (an operating system 154, a backup program 150, a restore program 152, and the like) to implement various functions included in the storage apparatus 100 are stored in the memory 104. Note that a program to implement, using a filter algorithm (e.g., a bloom filter algorithm), a function to determine whether or not the chunk is a new chunk to be described later (a chunk sharing no common entity data with those in the storage device 106a) (hereinafter referred to as the new chunk determination function) in the storage apparatus 100 is also stored in the memory 104 besides those shown in FIG. 1. Note that these programs are stored in a predetermined recording medium that can be accessed by the storage apparatus 100 and provided (installed) into the storage apparatus 100, for example. Moreover, the programs are installed into the storage apparatus 100 by being downloaded through the communication network 174 or the like from another apparatus, for example.

The memory 104 has areas reserved for a write buffer 142 and a read cache 144, which are used to exchange data with the storage device 106. Moreover, in the memory 104, various tables used for de-duplication process and the like are stored. The tables include container index tables T110 (a container index table Tf112, a universal container index table Tc128 and a container index table TF114), a measurement table R160, a chunk index table U162, a content index table S164, a container index table TF114 and the like.

The operating system 154 implements, in the storage apparatus 100, a function to abstract hardware for application software, a function to provide a software operating environment using a multitasking method (process management method), a function to manage hardware resources, and the like. Moreover, the operating system 154 further implements, in the storage apparatus 100, functions as a file system, such as a function to receive an I/O request on a file basis from the host apparatus and a function to provide a file management environment with a hierarchical structure (directory structure).

The backup program 150 allows the storage apparatus 100 to implement a function to select between the de-duplication methods described above for the write data received from the host apparatus, and a function to actually perform the de-duplication process on data to be backed up. Moreover, the backup program 150 further allows the storage apparatus 100 to implement a function to store the data to be backed up and link information in the storage device 106 through the write buffer 142.

The restore program 152 allows the storage apparatus 100 to implement a function to read backup data stored in the storage device 106a using the content index table S164, the container index table TF114 and the read cache 144. Moreover, the restore program 152 further allows the storage apparatus 100 to implement a function to read the backup data stored in the storage device 106a using the read cache 144.

The storage apparatus 100 uses the container index table Tf112 in the execution of the backup program 150. Moreover, the storage apparatus 100 uses the container index table TF114 as appropriate in the execution of the restore program 152.

In the universal container index table Tc128, information about universal chunks is managed. The universal container index table Tc128 is read from the storage device 106a together with the backup program 150, and then expanded and held in the memory 104. For effective use of the memory 104, the storage apparatus 100 performs roll-in (staging from the storage device 106a to the memory 104) or roll-out (destaging from the memory 104 to the storage device 106a) of the container index tables T110 other than the universal container index table Tc128 to the memory 104 when necessary.

In the measurement table R160, various kinds of count information are managed, such as management information on the roll-in or roll-out of the container index tables 110, the presence or non-presence of overlapping chunks and the number thereof in each container, the load on the processor 102, the load on the network interface 108, the amount of the memory 104 in use, the amount of the temporary storage device 106b in use, and access frequency to the storage device 106 (the storage device 106a and the temporary storage device 106b). In the content index table S164, information about chunk storage location is managed for each content.

The storage device 106 (including the storage device 106a and the temporary storage device 106b) is configured using a plurality of storage drives as physical storage media, for example. Note that the storage device 106a and the temporary storage device 106b do not necessarily have to be the same hardware. The storage drives are hard disk drives or semiconductor storage devices (SSD) of SAS (Serial Attached SCSI), SATA (Serial ATA), FC (Fiber Channel), PATA (Parallel ATA), SCSI and the like. In the storage apparatus 100, the storage area of the storage device 106 is configured as a storage area of a RAID group formed by controlling the a plurality of storage drives using a RAID (Redundant Arrays of Inexpensive (or Independent) Disks) method (at least any of RAID 0 to 6), for example.

The storage device 106a stores a database (hereinafter referred to as the T table DB 120) to manage the container index tables T110, a database (hereinafter referred to as the U table DB 182) to manage the chunk index table U162, a database (hereinafter referred to as the S table DB 184) to manage the content index table S164, containers C (such as a container Cf132, a container Cg134, a container 136Ch and a container Cc 138) and the like. Note that data to be processed in the de-duplication process is stored in the container Cf132, the container Cg134, the container 136Ch and the container Cc138 through the write buffer 142.

In the temporary storage device 106b, data to be processed in the de-duplication process using the post-process method (data to be processed in the de-duplication process at later timing) is stored.

Next, the de-duplication process executed in the storage apparatus 100 is concretely described. Note that the following description is given taking as an example the case where the storage apparatus 100 performs processing related to data backup (hereinafter referred to as the backup process) and processing related to data restore (hereinafter referred to as the restore process) in response to an I/O request received from the host apparatus. First, description is given of how the storage apparatus 100 selects between the methods for the de-duplication process.

Figure 2:
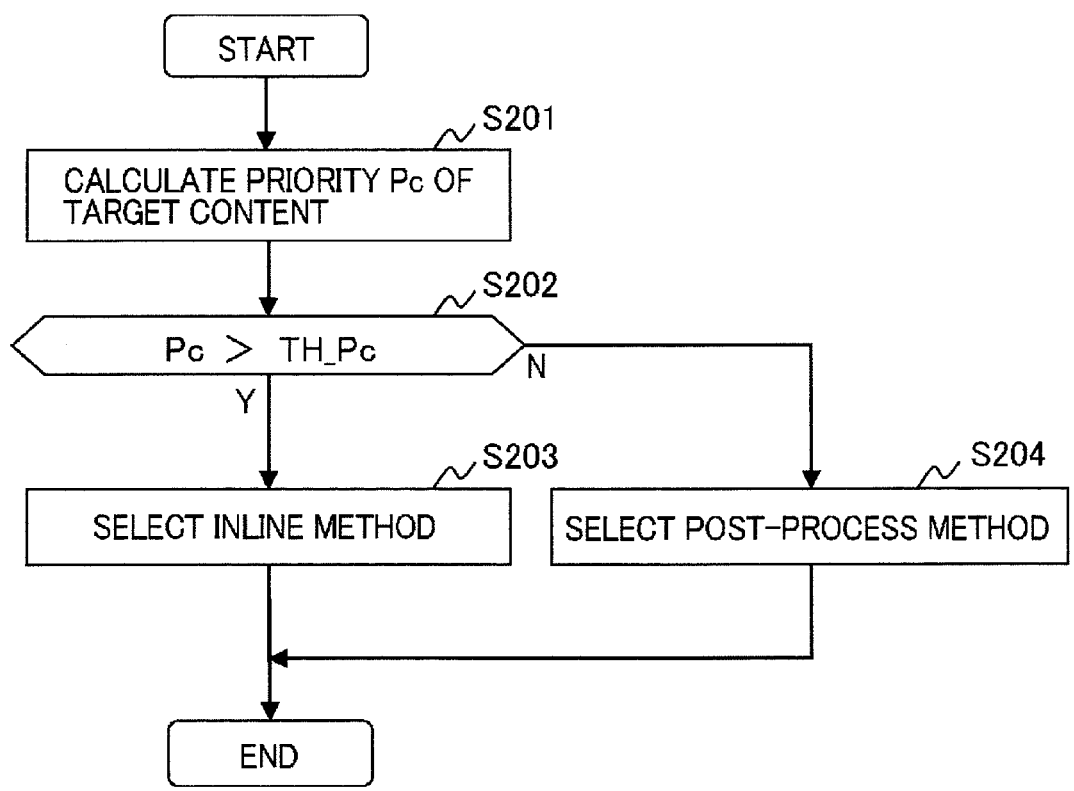
FIG. 2 is a flowchart showing de-duplication method selection process (part 1) S200.

FIG. 2 is a flowchart showing a process (hereinafter referred to as the de-duplication method selection process (Part 1) S200) to select between the inline method and the post-process method upon receipt of a content (hereinafter referred to as the target content) as write data from the host apparatus during a backup process. Note that, in the following description, the character "S" attached to each reference numeral denotes "Step".

As shown in FIG. 2, for the target content, the storage apparatus 100 first obtains a priority P of the de-duplication process to be an index for selection of the method for de-duplication, based on characteristics of the target content (S201). Note that, when the inline method is selected, the storage apparatus 100 sets a higher priority Pc for the content expected to result in more improvement in processing performance of the backup process.

For example, when there is a match between a file name of the target content and the entire or a part of a file name of a content (hereinafter referred to as the existing content) stored in the storage device 106a, the storage apparatus 100 sets a high priority Pc for the target content. This is because of the following reason. Specifically, in such a case, the file of the target content is the same as that of the existing content, and there are likely to be many overlapping chunks. Thus, the process can be efficiently executed using the inline method with a small access load on the storage device 106. Accordingly, the processing performance of the backup process can be improved by selecting the inline method.

Moreover, for example, the storage apparatus 100 performs duplication determination for several chunks from the first target content (which are not necessarily limited to several chunks from the first one, but may be some chunks in the target content) (e.g., compares some data of the target content with the data stored in the storage device 106a). Then, the storage apparatus 100 sets a higher priority Pc to the content with a higher de-duplication rate thus obtained (e.g., indicated by a ratio of data size before and after the de-duplication process). This is because, by selecting the inline method for those having high de-duplication rate as described above, the number of accesses to the storage device 106 is reduced, and thus the backup process performance can be improved.

Furthermore, for example, when the target content is backup data of a second or later generation, the storage apparatus 100 sets a high priority Pc. This is because the backup data of the second or later generation is likely to overlap with the existing content compared with backup data of a first generation. Thus, the backup process performance can be improved by selecting the inline method.

Moreover, for example, the storage apparatus 100 sets a higher priority Pc for a target content with a larger file data size. This is because, by actively applying the inline method to a content with large file data size, the required capacity of the temporary storage device 106b can be reduced.

Note that the methods for setting the priority Pc described above are just an example, and other methods may be used to set the priority Pc. Moreover, the priority Pc may be set by combining the setting methods described above or by combining the setting methods described above with still other methods.

Referring back to FIG. 2, the storage apparatus 100 then compares the priority Pc with a preset threshold TH_Pc (S202). Note that the threshold TH_Pc is set by the management apparatus 172, for example. The threshold TH_Pc may also be stored in an initialization file or the like, for example, and automatically read by the storage apparatus 100 at the start of the backup program 150 or the like. Alternatively, the storage apparatus 100 may dynamically update the threshold TH_Pc.

When the priority Pc is larger than the threshold TH_Pc (S202: Y), the storage apparatus 100 selects the inline method as the de-duplication process method for the target content (S203). On the other hand, when the priority Pc is not more than the threshold TH_Pc (S202: N), the storage apparatus 100 selects the post-process method as the de-duplication process method for the target content (S204).

Figure 3:
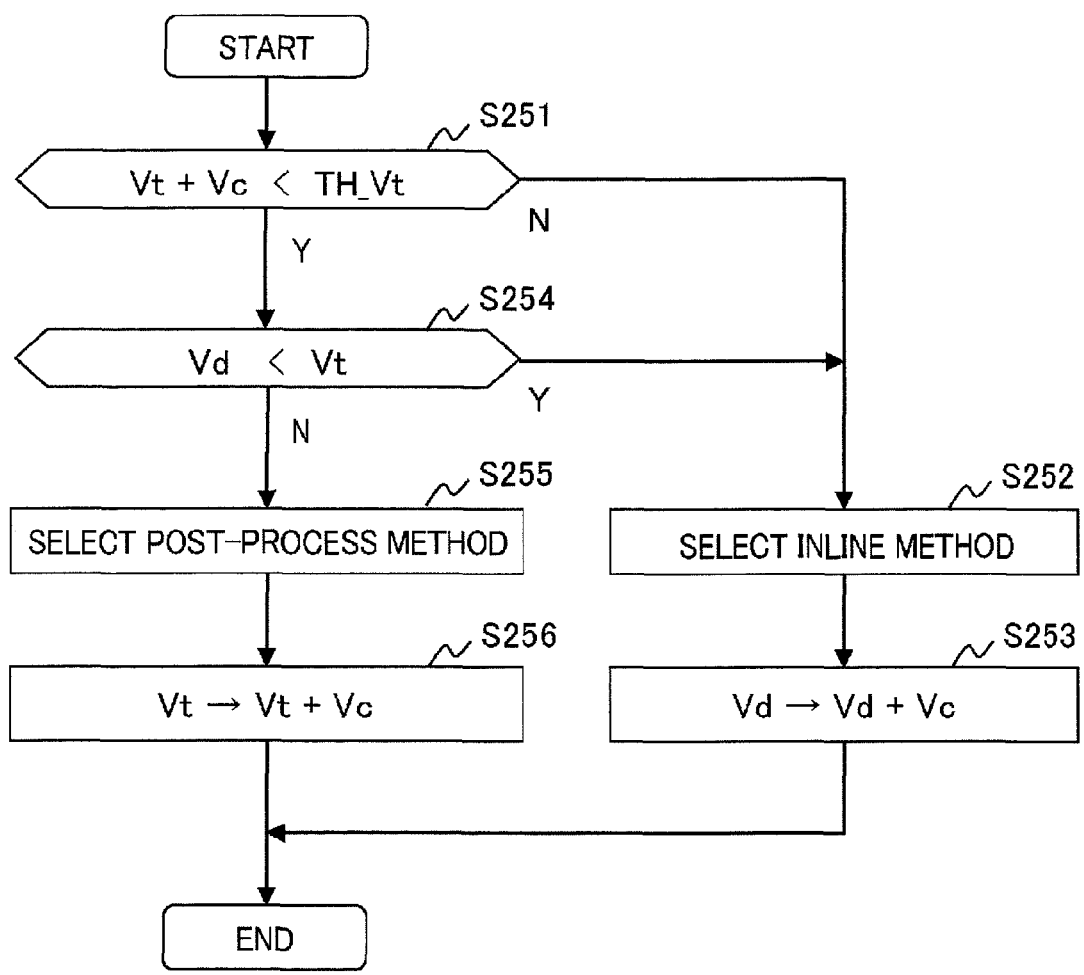
FIG. 3 is a flowchart showing de-duplication method selection process (part 2) S250.

While the priority Pc of the target content is set and the de-duplication process method is selected based on the priority in the de-duplication method selection process S200 described above, the de-duplication process method can also be selected while taking into consideration an upper limit capacity (limit value) of the temporary storage device 106b. FIG. 3 shows a process example in such a case (hereinafter referred to as the de-duplication method selection process (Part 2) S250).

As shown in FIG. 3, the storage apparatus 100 first determines whether or not the target content can be stored in the temporary storage device 106b (S251). To be more specific, the storage apparatus 100 obtains a sum Vt+Vc of a total size Vt (hereinafter referred to as the post-process total size Vt) of the contents currently stored in the temporary storage device 106b and the content size Vc of the target content, and then compares the obtained value Vt+Vc with a preset threshold TH_Vt (limit value). Note that the threshold TH_Vt is a value obtained by taking into consideration a predetermined allowance.

When the sum Vt+Vc is less than the threshold TH_Vt (S251: Y), i.e., when the target content can be stored in the temporary storage device 106b, the storage apparatus 100 performs processing from S254. On the other hand, when the sum Vt+Vc is not less than the threshold TH_Vt (S251: N), i.e., when the target content cannot be stored in the temporary storage device 106b, the storage apparatus 100 performs processing from S252.

In S252, the storage apparatus 100 selects the inline method as the de-duplication process method for the target content. Thereafter, the storage apparatus 100 adds the data size Vc of the target content to an inline total size Vd that is a variable to manage the total size of the content for which the inline method is currently selected (S253).

In S254, the storage apparatus 100 compares the inline total size Vd with the post-process total size Vt that is a variable to manage the total size of the contents currently stored in the temporary storage device 106b. When the post-process total size Vt exceeds the inline total size Vd as the result of the comparison (S254: Y), the storage apparatus 100 selects the inline method as the de-duplication process method for the target content (S252).

On the other hand, when the post-process total size Vt is not more than the inline total size Vd in S254 (S254: N), the storage apparatus 100 selects the post-process method as the de-duplication process method for the target content (S255), and then adds the target content data size Vc to the post-process total size Vt (S256).

The reason why the de-duplication process method for the target content is selected based on the result of the comparison between the post-process total size Vt and the inline total size Vd is to balance as much as possible the total size of contents to be processed in the inline method and the total size of contents to be processed in the post-process method. By balancing the two total sizes, the capacity of the temporary storage device 106b to be required can be reduced to up to half, or below half, the total data size of the contents to be processed in the backup process.

The de-duplication method selection process (Part 2) S250 described above makes it possible to flexibly set the capacity of the temporary storage device 106b by setting the threshold TH_Vt, thus improving the flexibility of the operation of the storage apparatus 100.

Subsequently, description is given of processing performed when the storage apparatus 100 receives an I/O request from the host apparatus for the purpose of backing up and restoring contents. The following description is given of, as an example, processing performed when the storage apparatus 100 receives an I/O request from the host apparatus for the purpose of backing up and restoring three contents (hereinafter respectively referred to as the content $f_1$ (260), content $f_2$ (270) and content $f_3$ (280)).

Note that the content $f_1$ (260) among the three contents is first-generation backup data, the content $f_2$ (270) is second-generation backup data, and the content $f_3$ (280) is third-generation backup data. Moreover, the storage apparatus 100 is assumed to receive I/O requests for the respective contents in the order of the content $f_1$ (260), the content $f_2$ (270) and the content $f_3$ (280).

Figure 4:
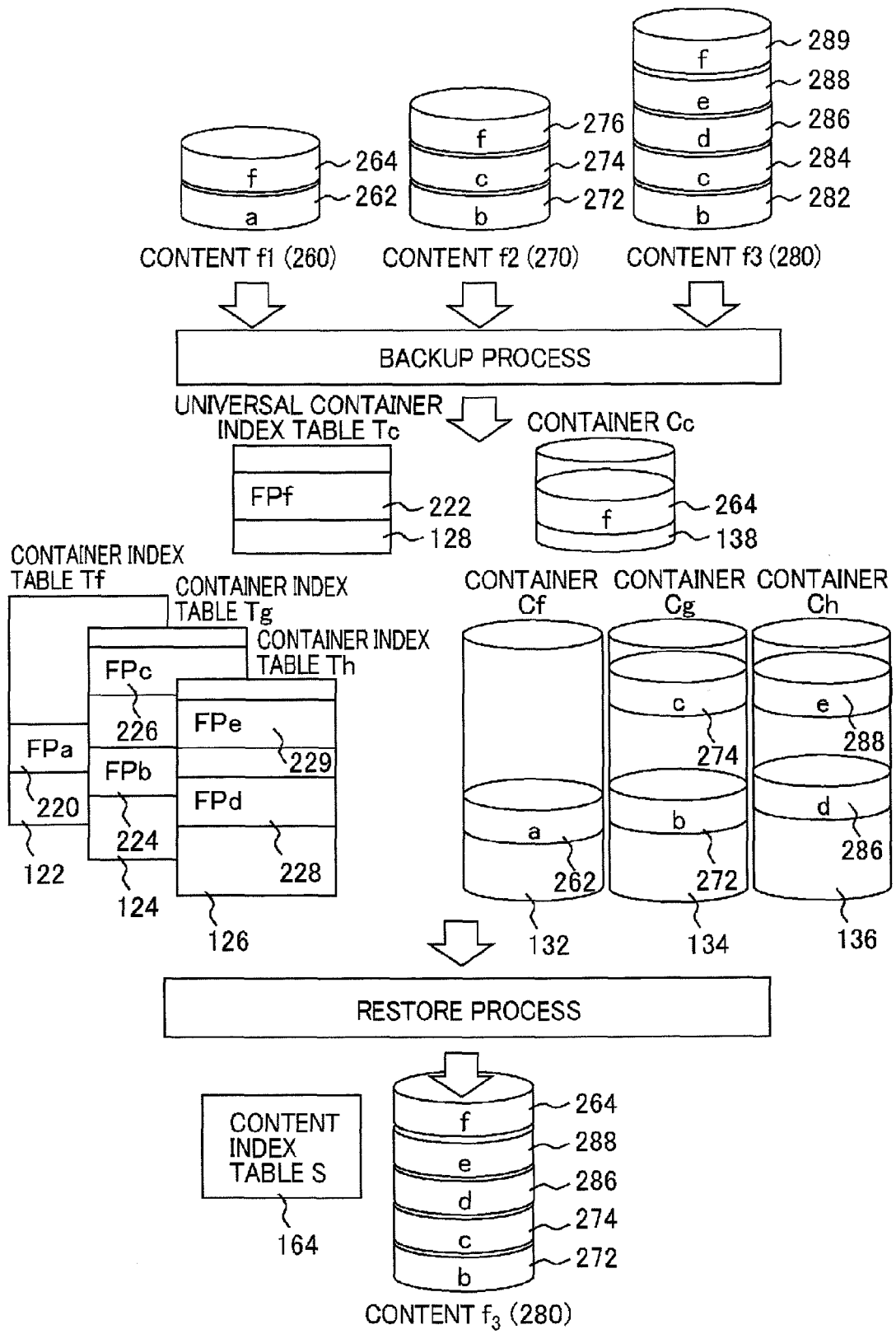
FIG. 4 is a diagram schematically showing a backup process.

As shown in FIG. 4, the storage apparatus 100 divides the content $f_1$ (260) received with the I/O request for backup from the host apparatus into a chunk a (262) and a universal chunk f (264). Also, the storage apparatus 100 divides the content $f_2$ (270) received from the host apparatus into a chunk b (272), a chunk c (274) and a universal chunk f (276). Moreover, the storage apparatus 100 divides the content $f_3$ (280) received from the host apparatus into a chunk b (282), a chunk c (284), a chunk d (286), a chunk e (288) and a universal chunk f (289).

The storage apparatus 100 uses a universal container Cc (138) and the universal container index table Tc128 for de-duplication of the contents received from the host apparatus. The universal container Cc (138) has data (entity data) of universal chunks stored therein, and the universal container index table Tc128 has management information on the universal chunks stored therein.

Note that, at the start of the backup program 150, for example, the storage apparatus 100 rolls in the universal container index table Tc128 and the universal container Cc (138) to the memory 104. Then, at the end of the backup program 150, the storage apparatus 100 rolls out the table and container to the storage device 106a. The instruction to roll in or roll out is given by an administrator, operator or the like of the storage apparatus 100, for example, operating the management apparatus 172. Moreover, for example, the instruction is automatically given by the storage apparatus 100 according to initialization information and the like at the start or end of the backup program 150. The universal container Cc (138) and the universal container index table Tc128 are resident in the memory 104.

Upon receipt of the content $f_1$ (260) from the host apparatus, the storage apparatus 100 generates a container Cf (132) and stores the chunk a (262) therein. The storage apparatus 100 also generates a container index table Tf 122 for the container Cf 132 and stores management information FPa (220) on the chunk a (262) in the generated container index table Tf 122. Note that, in this example, the chunk f (264) is processed in de-duplication from the information of the universal container index table Tc128, and entity data thereof is not stored in the container Cf (132). Meanwhile, the management information FPf (222) on the universal chunk f is stored in the universal container index table Tc128.

Subsequently, upon receipt of the content $f_2$ (270) from the host apparatus, the storage apparatus 100 generates a container Cg (134), and stores the chunk b (272) and the chunk c (274), which do not overlap with the chunk of the content $f_1$ (260), in the container Cg (134).

Note that if there is space in the container Cf (132) upon receipt of the content $f_2$ (270), the chunk b (272) and the chunk c (274) may be stored in the container Cf (132). However, this example shows the case where there is no space available in the container Cf (132).

Moreover, the storage apparatus 100 generates a container index table Tg (124) for the container Cg (134), and stores management information FPb (224) on the chunk b (272) and management information FPc (226) on the chunk c (274) in the generated container index table Tg (124).

Thereafter, upon receipt of the content $f_3$ (280) from the host apparatus, the storage apparatus 100 generates a container Ch (136), and stores the chunk d (286) and the chunk e (288), which do not overlap with the content $f_1$ (260) or the content $f_2$ (270), in the container Ch (136).

Note that if there is space in the container Cg (134) upon receipt of the content $f_3$ (280), the chunk d (286) and the chunk e (288) may be stored in the container Cg (134). However, this example shows the case where there is no space available in the container Cg (134).

The storage apparatus 100 generates a container index table Th (126) for the container Ch (136), and stores management information FPd (228) on the chunk d (286) and management information FPe (229) on the chunk e (288) in the generated container index table Th (126).

Upon receipt of an I/O request for restoring the content $f_3$ (280) from the host apparatus, the storage apparatus 100 rolls in the container Cg (134), the container Ch (136) and the universal container Cc (138) to the memory 104. Then, the storage apparatus 100 combines the content $f_3$ (280) based on the information of the content index table S164, and transmits the combined content $f_3$ (280) to the host apparatus.

Figure 5:
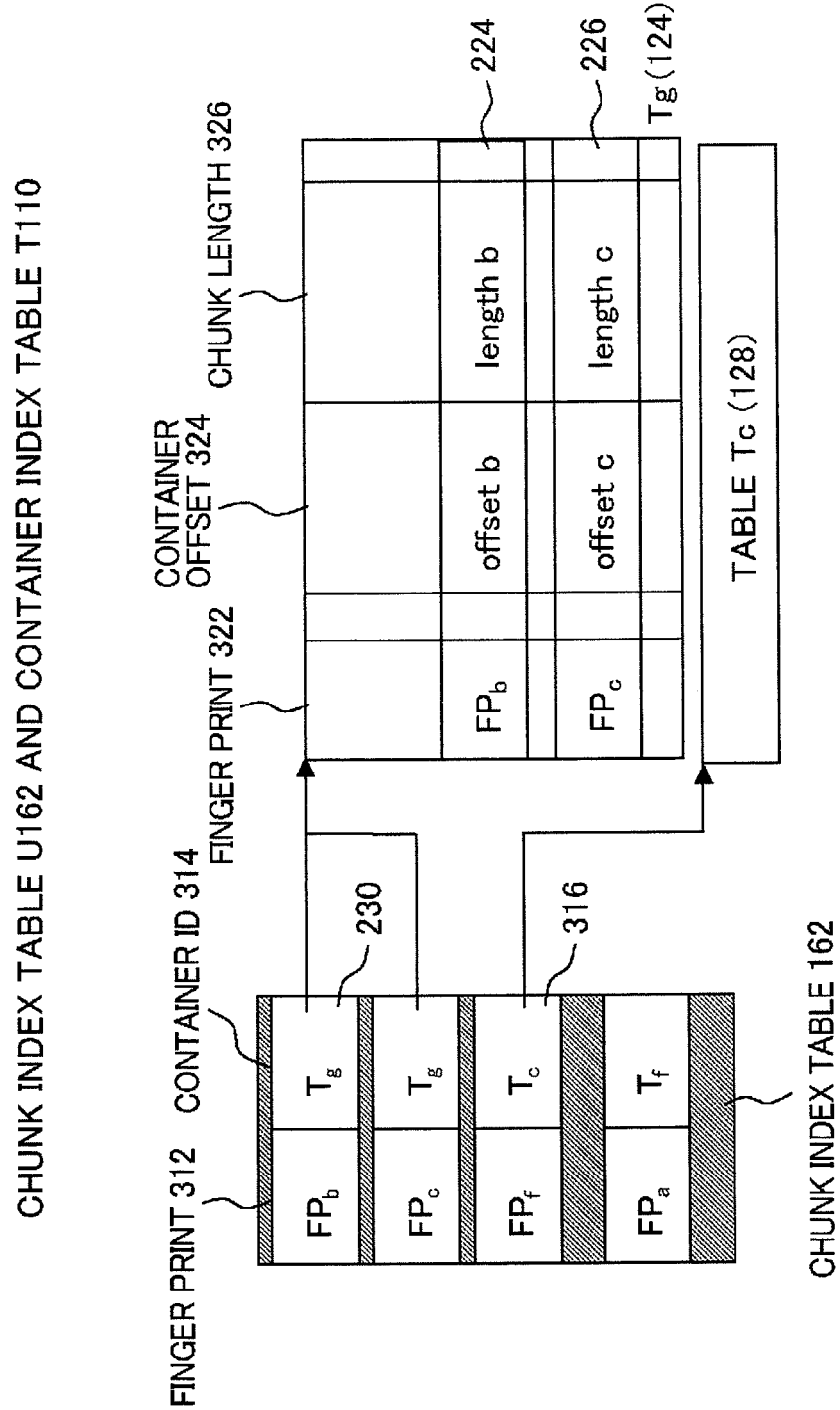
FIG. 5 is a diagram showing a configuration of a chunk index table 162 and a container index table T110.

With reference to FIG. 5, description is given of the chunk index table U162 and the container index tables T110 (the container index table Tf (122), the container index table Tg (124), the container index table Th (126) and the universal container index table Tc (128). Note that FIG. 5 corresponds to a state immediately after the storage apparatus 100 receives an I/O request of the content $f_2$ (270) shown in FIG. 4.

The container index table Tf (122), the container index table Tg (124), the container index table Th (126) and the universal container index table Tc128 have the same configuration and each include one or more records in which management information for each chunk is stored.

The record includes items of a finger print 322, a container offset 324 and a chunk length 326. In the finger print 322, a finger print of the chunk is stored. In the container offset 324, information (an offset value) indicating a physical storage location (lead position) of the chunk in the storage device 106a is stored. In the chunk length 326, information indicating the length (data size) of the chunk is stored.

The chunk index table 162 manages correspondence between the finger print of the chunk stored in the container and an identifier of the container (hereinafter referred to as the container ID 314) in which the chunk is stored. The container ID 314 is also used as pointer information in referring to the container index table 110. As the container ID 314, for example, an identifier (e.g., uuid (Universally Unique Identifier)) that can be referred to by the backup program 150 and the restore program 152 is used.

The chunk index table 162 is used, for example, to identify the container index table Tg (124) that has not been rolled in to the memory 104. For example, it is assumed that, when a de-duplication process is performed for the chunk b (272) of the content $f_3$ (280) in FIG. 4, the container index table Tg (124) required for the process is not rolled in to the memory 104. In this case, the storage apparatus 100 reads, from the chunk index table 162 shown in FIG. 5, a container index table (the container index table Tg (124) in FIG. 5) whose container ID 314 is Tg (230) associated with the finger print 312 of the chunk b (272), and rolls in the read container index table to the memory 104.

With reference to FIG. 6, the content index table S164 is described. The content index table S164 is generated for each content. The content index table S164 manages information on chunks of each content. As shown in FIG. 6, the content index table S164 includes records including items of a content ID 361, a finger print 362, a container ID 364, a content offset 366 and a chunk length 368.

In the content ID 361 among the items described above, an identifier of the content (hereinafter referred to as the content ID) is stored. In the finger print 362, a finger print of chunks included in the content is stored. In the container ID 364, identification information on a container C having chunks stored therein is stored. In the content offset 366, information indicating locations of the chunks in the container C is stored. In the chunk length 368, information indicating the data size (data length) of the chunks is stored.

In $S_{f3}$ (200) among the records shown in FIG. 6, information on the content $f_3$ (280) in FIG. 4 is stored. The information of the record shows that the content $f_3$ (280) can be re-produced by the chunk b, chunk c, chunk d, chunk e, and chunk f, and also shows which container and where in the container each of the chunks is stored (the position specified by the content offset 366 and the chunk length 368).

Figure 7:
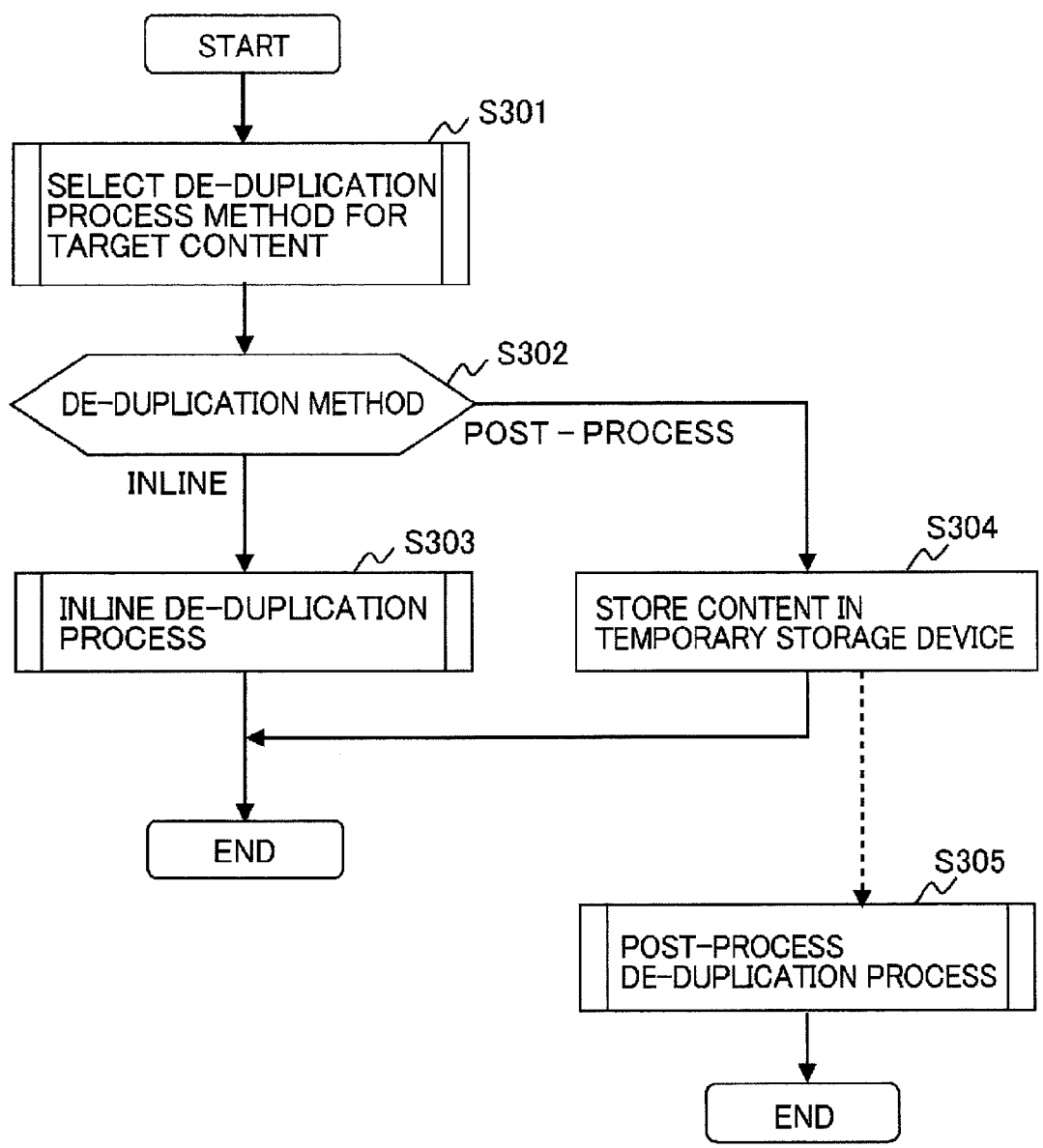
FIG. 7 is a flowchart showing the overall flow of a backup process in a first embodiment.

FIG. 7 is a flowchart showing the overall flow of a backup process performed by the storage apparatus 100.

In a backup process S300, the storage apparatus 100 first selects a de-duplication process method to be used for target content (S301). Note that this selection is performed by executing the de-duplication method selection process (Part 1) S200 or de-duplication method selection process (Part 2) S250 described above, for example. The storage apparatus 100 performs processing from S303 when selecting the inline method (S302: inline), and performs processing from S304 when selecting the post-process method (S302: Post-Process).

In S303, the storage apparatus 100 immediately executes the de-duplication process for the target content, and then terminates the backup process S300.

In S304, the storage apparatus 100 stores the target content in the temporary storage device 106b.

The storage apparatus 100 executes the de-duplication process using the post-process method at later timing for the target content stored in the temporary storage device 106b (S305), and then terminates the backup process S300. Note that the storage apparatus 100 starts the de-duplication process using the post-process method (S305) at a suitable timing to improve the processing performance or utilization efficiency of the storage apparatus 100 by monitoring in real time the load status of hardware resources (the processor 102, the memory 104, the storage device 106 and the like) of the storage apparatus 100 based on the information of the measurement table R160, for example.

Figure 8:
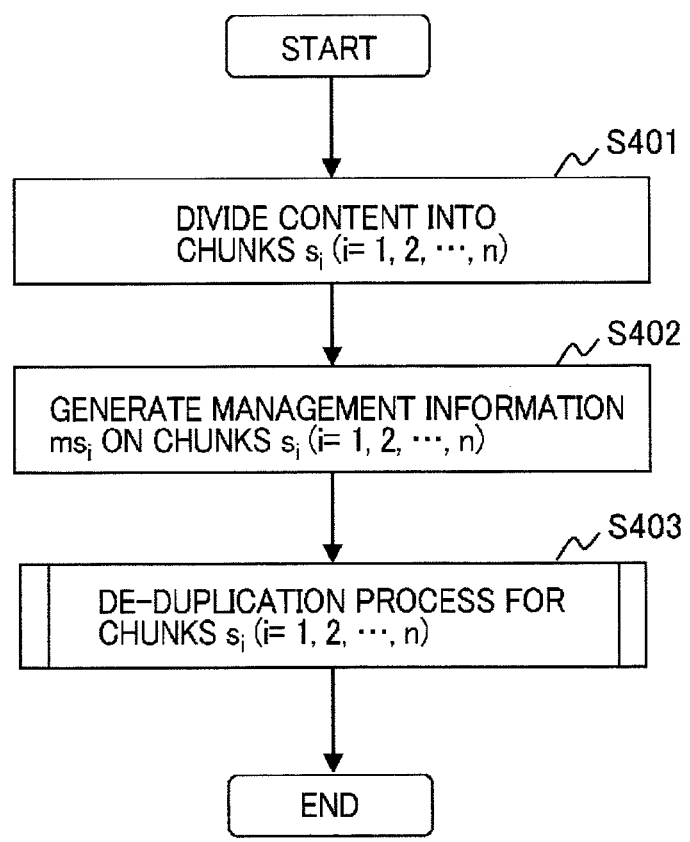
FIG. 8 is a flowchart showing a de-duplication process S303 in the case of an inline method.

FIG. 8 is a flowchart showing details of the process S303 (hereinafter referred to as the de-duplication process S303 in the case of the inline method) in FIG. 7. With reference to FIG. 8, the process S303 is described below.

As shown in FIG. 8, the storage apparatus 100 first divides the target content into a plurality of chunks (S401).

Then, the storage apparatus 100 generates chunk management information (S402). The chunk management information includes a finger print of the chunk, information (offset) indicating the location of the chunk within the content, information indicating a chunk length, and the like.

Thereafter, the storage apparatus 100 performs the de-duplication process in units of chunks (S403), and then terminates the de-duplication process S303.

Figure 9:
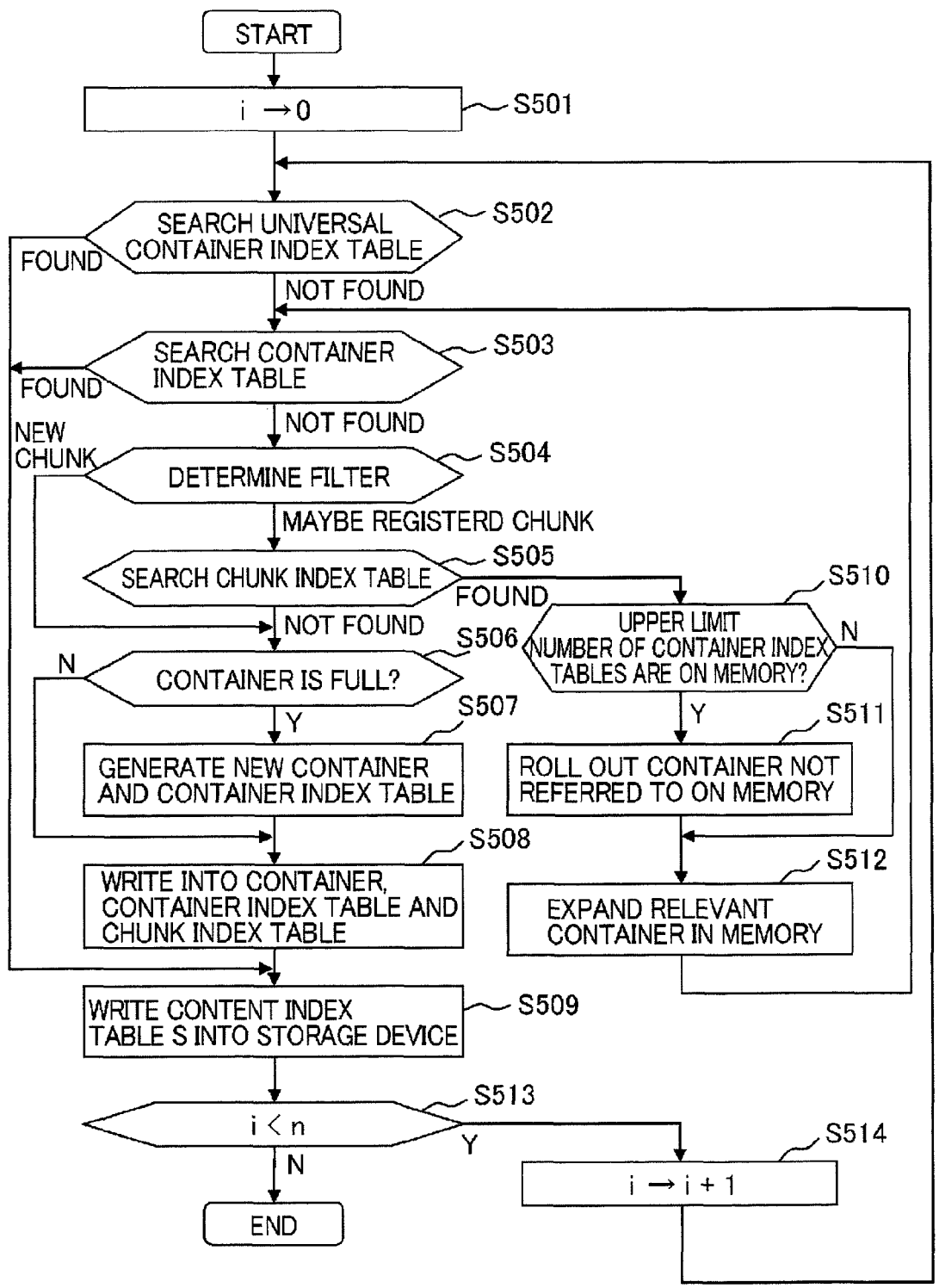
FIG. 9 is a flowchart showing a chunk de-duplication process S403.

FIG. 9 is a flowchart showing the process S403 (hereinafter referred to as the chunk de-duplication process S403).

First, the storage apparatus 100 resets a counter i (i=0) used for a loop process from S502 to S513 (S501).

Next, the storage apparatus 100 searches the universal container index table Tc128 stored in the memory 104 and performs de-duplication determination on the chunks (the chunks that are being currently processed (chunks identified by the value of the counter i) are hereinafter referred to as the target chunks) generated in S401 in FIG. 8 (S502).

First, the storage apparatus 100 determines whether or not a finger print identical to the finger print of the target chunk is in the universal container index table Tc128. When the finger print identical to the finger print of the target chunk is in the universal container index table Tc128, the storage apparatus 100 confirms that there is "duplication present" (S502: Found), and then performs processing from S509. On the other hand, when the finger print identical to the finger print of the target chunk is not in the universal container index table Tc128, the storage apparatus 100 confirms that there is "no duplication" (S502: Not found), and then performs processing from S503.

In S503, the storage apparatus 100 determines whether or not a finger print identical to the finger print of the target chunk is in the container index table T110 stored in the memory 104 (excluding the universal container index table Tc128). When the finger print identical to the finger print of the target chunk is in the container index table T110, the storage apparatus 100 confirms that there is "duplication present" (S503: Found), and then performs processing from S509. On the other hand, when the finger print identical to the finger print of the target chunk is not in the container index table T110, the storage apparatus 100 confirms that there is "no duplication" (S503: Not found), and then performs processing from S504.

In S504, the storage apparatus 100 uses a new chunk determination function to determine whether or not there is or there is likely to be a chunk having the same data (entity data) as the target chunk in the storage device 106a. When it is determined that the chunk having the same data as the target chunk is not in the storage device 106 (S504: New Chunk), then the storage apparatus 100 performs processing from S506.

On the other hand, when it is determined that the chunk having the same data as the target chunk is likely to be in the storage device 106 (S504: Maybe Registered Chunk), then the storage apparatus 100 performs processing from S505. Note that, when the new chunk determination function is one using a bloom filter algorithm, for example, the storage apparatus 100 determines that the chunk having the same data as the target chunk is not in the storage device 106 if there is no collision of hash values. On the other hand, the storage apparatus 100 determines that the chunk having the same data as the target chunk is likely to be in the storage device 106 if there is a collision of hash values.

In S505, the storage apparatus 100 determines whether or not a finger print identical to the finger print of the target chunk is in the chunk index table U162. When the finger print identical to the finger print of the target chunk is not in the chunk index table U162 (S505: Not found), the storage apparatus 100 performs processing from S506.

On the other hand, when the finger print identical to the finger print of the target chunk is in the chunk index table U162 (S505: Found), the storage apparatus 100 acquires the container ID of the container in which the target chunk is stored from the chunk index table U162, and then performs processing from S510.

In S510, the storage apparatus 100 determines whether or not the number of the container index tables T110 currently stored in the memory 104 reaches a preset upper limit (predetermined threshold). When the number of the container index tables T110 stored in the memory 104 reaches the upper limit (S510: Y), the storage apparatus 100 rolls out the container index table T110 selected by LRU (Least Recently Used), for example, among the container index tables T110 (excluding the universal container index table Tc128) currently stored in the memory 104 (S511), and then performs processing from S512.

On the other hand, when the number of the container index tables T110 stored in the memory 104 (excluding the universal container index table Tc128) has not reached the upper limit (S510: N), the storage apparatus 100 performs processing from S512.

Note that the upper limit described above is set by the administrator, operator or the like using the management apparatus 172. Moreover, the upper limit may be previously set in an initialization file or the like, and may be automatically read by the storage apparatus 100 at the start of the backup program 150 or the like.

In S512, the storage apparatus 100 rolls in the container index table T110 having the target chunk stored therein to the memory 104, and then performs processing from S503.

As described above, the storage apparatus 100 performs the de-duplication determination by rolling in the container index table T110 highly associated with the target chunk in two steps using the container index table T110 and the chunk index table U162. Thus, the number of entries of the container index tables T110 to the memory 104 can be reduced. Accordingly, the memory 104 can be effectively used, and the storage capacity of the memory 104 can be prevented from running short. Moreover, accesses to the storage device 106 can be reduced. Furthermore, the use of the chunk index table U162 makes it possible to efficiently identify the container index table T110 to be rolled in to the memory 104.

In S506, the storage apparatus 100 determines whether or not the target chunk can be stored in the existing container C (whether or not the existing container C has space required to store the target chunk). When the target chunk can be stored in the existing container C (S506: N), the storage apparatus 100 performs processing from S508.

On the other hand, when the target chunk cannot be stored in the existing container C (S506: Y), the storage apparatus 100 generates a target container and a container index table (S507) and then performs processing from S508.

In S508, the storage apparatus 100 stores the target chunk in the existing container C or the newly generated container C. Also, the storage apparatus 100 stores management information on the target chunk in the existing container C or the new container C. Moreover, the storage apparatus 100 stores a message digest of the target chunk in the chunk index table U162, and then performs processing from S509. Note that, in order to reduce accesses to the storage device 106, the storage of the data in the container C, the container index table S164 and the chunk index table U162 may be performed through the write buffer 142.

In S509, the storage apparatus 100 writes the content index table S164 to be used in a restore process into the storage device 106a.

In S513, the storage apparatus 100 compares the value of the counter i with the number n of the chunks generated by dividing the target content in S401 in FIG. 8, and determines whether or not all the chunks generated by dividing the target content in S401 have been processed. When all the chunks have been processed (S513: N), the chunk de-duplication process S403 is completed. On the other hand, when there is a chunk yet to be processed (S513: Y), the storage apparatus 100 adds 1 to the counter i (S514), and then performs processing from S502.

Figure 10:
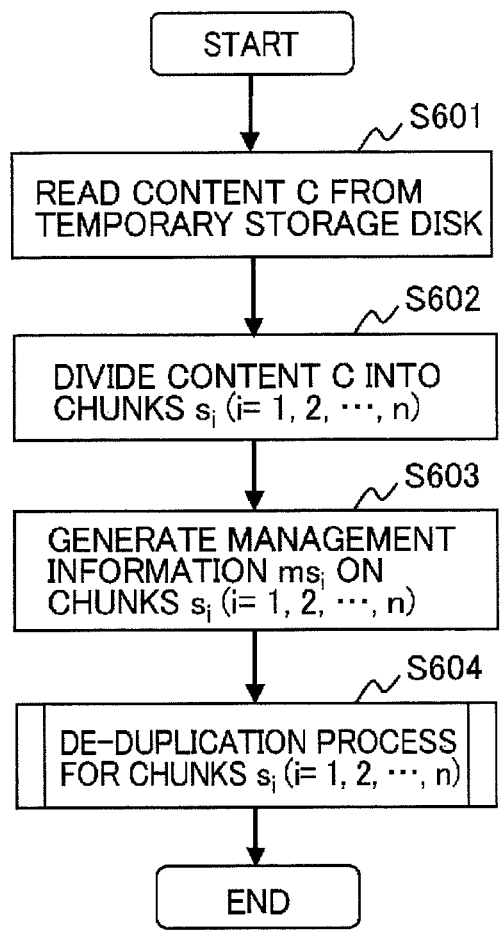
FIG. 10 is a flowchart showing a de-duplication process S305 in the case of a post-process method.

FIG. 10 is a flowchart showing details of the process S305 (hereinafter referred to as the de-duplication process S305 in the case of the post-process method) in FIG. 7. As shown in FIG. 10, in the process S305, the storage apparatus 100 first reads a content to be processed in the de-duplication process from the temporary storage device 106b (S601). Since processing thereafter (S602 to S604) is the same as the de-duplication process S303 (S401 to S403) in the inline method shown in FIG. 8, description thereof is omitted.

Figure 11:
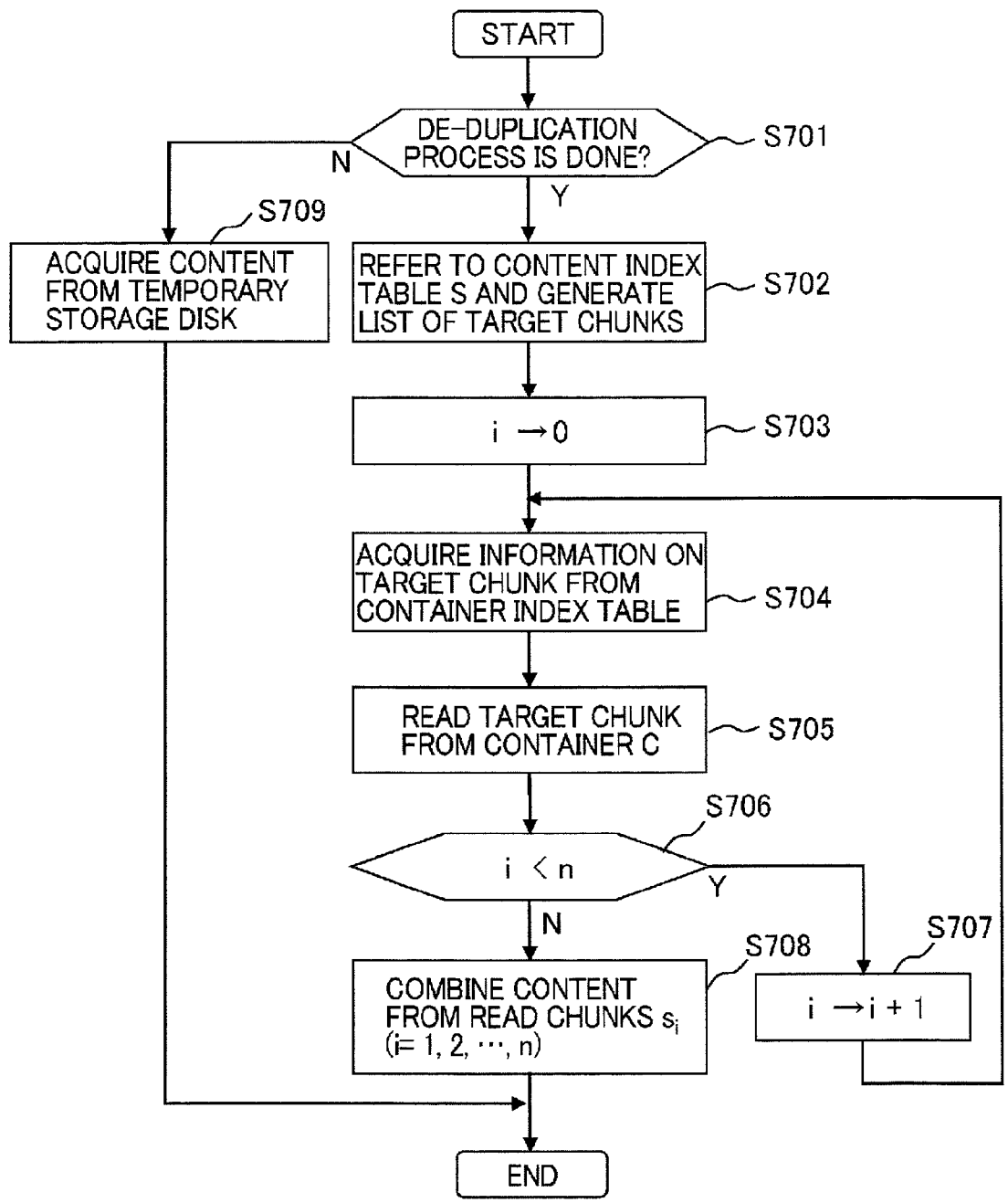
FIG. 11 is a flowchart showing a restore process S700.

FIG. 11 is a flowchart showing a restore process (hereinafter referred to as the restore process S700) performed by the storage apparatus 100. With reference to FIG. 11, the restore process is described below.

First, in response to a restore request received as an I/O request from the host apparatus, the storage apparatus 100 determines whether a content targeted for the restore (hereinafter referred to as the target content) is one already processed in the de-duplication process or one stored in the temporary storage device 106b while being yet to be processed in the de-duplication process (S701). Note that the storage apparatus 100 performs this determination by referring to the content index table S164, for example.

When the target content is yet to be processed in the de-duplication process (S701: N), the storage apparatus 100 reads the target content from the temporary storage device 106b and transmits the target content to the host apparatus (S709). Thereafter, the restore process S700 is terminated.

On the other hand, when the target content is already processed in the de-duplication process and stored in the storage device 106a (S701: Y), the storage apparatus 100 generates a list of chunks (hereinafter referred to as the target chunks) required to be read to respond to the host apparatus, based on the content index table S164 (S702).

In S703, the storage apparatus 100 sets 0 to the counter i to be used for a loop process from S704 to S706.

Thereafter, the storage apparatus 100 acquires information on the target chunk (the finger print of the target chunk, the location of the target chunk within the container C and the data size of the target chunk) from the container index table T110 (S704). To be more specific, the storage apparatus 100 reads the container index table 110 to which the target chunk belongs, which is identified by the content index table S164, from the storage device 106a into the memory 104, and thus acquires the target chunk information from the read container index table 110.

Next, the storage apparatus 100 reads the target chunk stored in the container C corresponding to the container index table T110, based on the target chunk information acquired in S704 (S705).

In subsequent S706, the storage apparatus 100 compares the number n of the chunks included in the target content with the counter number of the counter i to determine whether or not all the target chunks in the list generated in S702 have been read (S706). When all the target chunks have been read (S706: N), the storage apparatus 100 generates a content by combining the read target chunks, transmits the generated content to the host apparatus, and then terminates the restore process (S708). To be more specific, the storage apparatus 100 restores the original content by combining the read target chunks based on the offset information and chunk length information in the content stored in the content index table 164.

On the other hand, when reading of all the target chunks is not completed (S706: Y), the storage apparatus 100 adds 1 to the counter i (S707), and then performs processing from S704.

<Simultaneous Processing Number Control in De-Duplication Process>

The storage apparatus 100 includes a function to control (adjust) the number of simultaneous processes (the number of parallel processes) in the de-duplication process using the inline method as well as the number of simultaneous processes (the number of parallel processes) in the de-duplication process using the post-process method.

In the de-duplication process using the post-process method, for example, data needs to be read from the temporary storage device 106b. However, when data write into the temporary storage device 106b and data read by the de-duplication process are simultaneously performed, accesses to the storage device 106 are increased, resulting in degradation of processing performance (processing efficiency) of the backup process (de-duplication process). Therefore, when data write to the temporary storage device 106b is frequently performed, the storage apparatus 100 reduces the number of simultaneous processes in the de-duplication process using the post-process method, and increases the number of simultaneous processes in the de-duplication process using the inline method, thereby improving the processing performance of the backup process.

Moreover, for example, when transfer performance of contents from the host apparatus is lower than the processing performance of the storage apparatus 100 due to high load on the host apparatus side or of the communication network 174, a content reception waiting state occurs in the de-duplication process using the inline method, resulting in reduction in utilization efficiency of the storage apparatus 100. In such a case, the storage apparatus 100 increases the number of simultaneous processes in the de-duplication process using the post-process method to improve the utilization efficiency of the storage apparatus 100.

Figure 12:
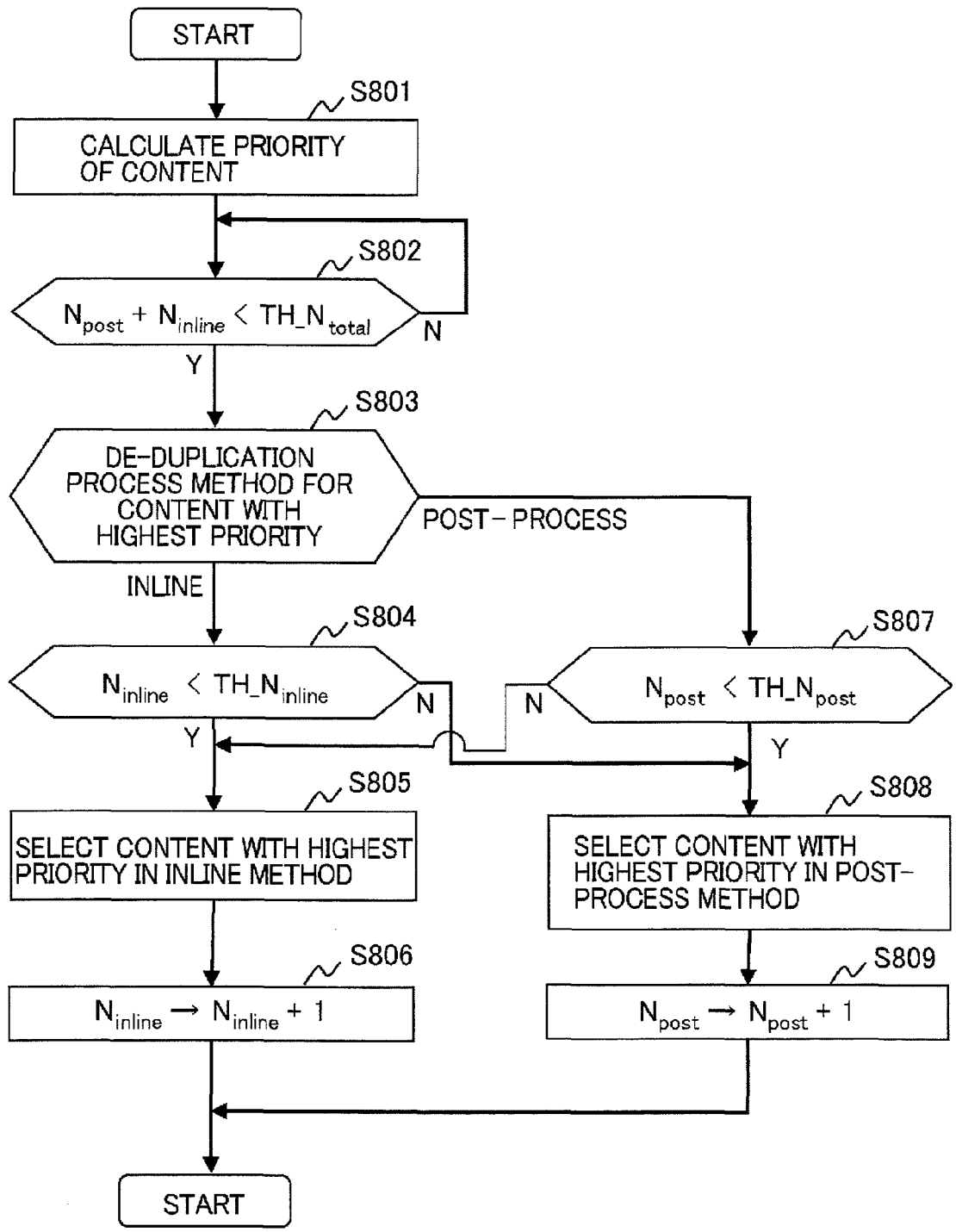
FIG. 12 is a flowchart showing a simultaneous processing number control process S800 in the de-duplication process.

FIG. 12 is a flowchart showing a process related to control of the number of simultaneous processes in the de-duplication process using the inline method and the number of simultaneous processes in the de-duplication process using the post-process method (hereinafter referred to as the simultaneous processing number control process S800 in the de-duplication process) performed by the storage apparatus 100.

Note that the process S800 is executed, for example, at the timing of starting the de-duplication process using the post-process method or the de-duplication process using the inline method for contents for which the de-duplication process method is determined in S301 in FIG. 7. Also, the process S800 is executed, for example, when the storage apparatus 100 receives contents from the host apparatus. Moreover, the process S800 is executed, for example, when the inline de-duplication process is completed or when the post-process de-duplication process is completed. Furthermore, the process S800 is executed, for example, when it is detected that there is a content remaining in the temporary storage device 106b, for which the de-duplication process is not started.

As shown in FIG. 12, the storage apparatus 100 first sets priorities of all the contents waiting for the start of the post-process de-duplication process and waiting for the start of the inline de-duplication process (contents registered in a queue for the post-process de-duplication process and contents registered in a queue for the inline de-duplication process) (S801). Note that the storage apparatus 100 sets a higher priority for the contents expected to result in more improvement in processing performance of the backup process by executing the de-duplication process.

For example, when there is a match between a file name of the content and the entire or a part of a file name of a content (hereinafter referred to as the existing content) stored in the storage device 106a, the storage apparatus 100 sets a high priority for the content. This is because of the following reason. Specifically, the matching between the file name of the target content and the file name of the existing content indicates that the file of the target content is the same as that of the existing content, and there are likely to be many overlapping chunks in this case. For this reason, the number of accesses to the storage device 106a in the execution of the de-duplication process is small, and improvement in the processing performance of the backup process can be expected.

Moreover, for example, the storage apparatus 100 performs duplication determination for several chunks from the first content, and sets a high priority to the content with a higher de-duplication rate thus obtained (a ratio of data amount before and after the de-duplication process). This is because, the number of accesses to the storage device 106a in the execution of the de-duplication process is small for the content with a higher de-duplication rate, and thus the backup process performance can be expected to be improved.

Furthermore, for example, when the content is backup data of a second or later generation, the storage apparatus 100 sets a high priority. This is because the backup data of the second or later generation is likely to overlap with the existing content compared with backup data of a first generation. Thus, the number of accesses to the storage device 106a in the execution of the de-duplication process is reduced, and the backup process performance can be expected to be improved.

Moreover, for example, the storage apparatus 100 sets a higher priority for a content (file) with a smaller data size, the content being stored in the temporary storage device 106b. This is because of the following reason. Specifically, in the case of the post-process method, once the de-duplication process is finished, the relevant data is deleted from the temporary storage device 106b to release the storage area of the temporary storage device 106b. Thus, by executing the de-duplication process on the content with a small data size, the storage area of the temporary storage device 106b is released at short intervals. Accordingly, the use efficiency of the temporary storage device 106b is improved. As a result, the backup process performance can be expected to be improved.

Note that the methods for setting the priority described above are just an example, and other methods may be used to set the priority. Moreover, the priority may be set by combining the setting methods described above or by combining the setting methods described above with still other methods.

Referring back to FIG. 12, the storage apparatus 100 then compares a preset upper limit $TH\_N_{total}$ with the sum of the current number of simultaneous processes $N_{inline}$ in the inline de-duplication process and the current number of simultaneous processes $N_{post}$ in the post-process de-duplication process (S802). When the sum $N_{inline}+N_{post}$ is not more than the upper limit $TH\_N_{total}$ (S802: Y), the storage apparatus 100 performs processing from S803. On the other hand, when the sum $N_{inline}+N_{post}$ exceeds the upper limit $TH\_N_{total}$, i.e., when a new de-duplication process cannot be started for the content waiting for the de-duplication process, the storage apparatus 100 waits until any of the de-duplication processes in execution is finished (S802: N).

In S803, the storage apparatus 100 identifies the content having the highest priority (hereinafter referred to as the target content) among all the contents waiting for the start of the post-process de-duplication process or the inline de-duplication process, and determines the de-duplication process method for the target content. When the de-duplication process method for the target content is the inline method (S803: Inline), the storage apparatus 100 performs processing from S804. On the other hand, when the de-duplication process method for the target content is the post-process method (S803: Post-process), the storage apparatus 100 performs processing from S807.

In S804, the storage apparatus 100 determines whether or not the inline de-duplication process can be started for the target content. To be more specific, the storage apparatus 100 compares the current number of simultaneous processes $N_{inline}$ in the inline de-duplication process with a preset upper limit $TH\_N_{inline}$. When the number of simultaneous processes $N_{inline}$ is not more than the upper limit $TH\_N_{inline}$ (S804: Y), the storage apparatus 100 performs processing from S805. On the other hand, when the number of simultaneous processes $N_{inline}$ exceeds the upper limit $TH\_N_{inline}$ (S804: N), the storage apparatus 100 performs processing from S808.

In S807, the storage apparatus 100 checks if the post-process de-duplication process can be started for the target content. To be more specific, the storage apparatus 100 compares the current number of simultaneous processes $N_{post}$ in the post-process de-duplication process with a preset upper limit $TH\_N_{post}$. When the number of simultaneous processes $N_{post}$ is not more than the upper limit $TH\_N_{post}$ (S807: Y), the storage apparatus 100 performs processing from S808. On the other hand, when the number of simultaneous processes $N_{post}$ exceeds the upper limit $TH\_N_{post}$ (S807: N), the storage apparatus 100 performs processing from S805.

In S805, the storage apparatus 100 selects, as a content to be processed in the de-duplication process, a content having the highest priority among all the contents waiting for the start of the inline de-duplication process, and starts the de-duplication process for the content. Also, the storage apparatus 100 adds 1 to the current number of simultaneous processes $N_{inline}$ in the inline de-duplication process (S806).

Meanwhile, in S808, the storage apparatus 100 selects, as a content to be processed in the de-duplication process, a content having the highest priority among all the contents waiting for the start of the post-process de-duplication process, and starts the de-duplication process for the content. In this case, the storage apparatus 100 adds 1 to the current number of simultaneous processes $N_{post}$ in the post-process de-duplication process (S809).

Note that, although not shown in FIG. 12, the storage apparatus 100 subtracts 1 from $N_{inline}$ when the inline de-duplication process is finished. Likewise, the storage apparatus 100 subtracts 1 from $N_{post}$ when the post-process de-duplication process is finished.

In the above process, the priority is set after the content to be processed in the post-process de-duplication process is stored in the temporary storage device 106*b*. However, the priority may be set before the content to be processed in the post-process de-duplication process is stored in the temporary storage device 106*b*.

As the priority described above, the priority Pc calculated by the de-duplication method selection process (Part 1) S200 shown in FIG. 2 may be used. Moreover, for the contents stored in the temporary storage device 106*b*, the storage apparatus 100 may seek and update the priorities as needed. Furthermore, the storage apparatus 100 may change the priority according to the access frequency to the temporary storage device 106*b*, the usage of the processor 102 or the like, for example.

For example, the storage apparatus 100 may monitor the progress (processing speed) of the inline de-duplication process or the progress (processing speed) of the post-process de-duplication process as needed (regularly or irregularly), and may set a higher priority for the content for which the progress is fast (processing speed is fast).

For example, instead of reflecting the usage of the processor 102 and the like on the priority of the content in the inline method or post-process method, the storage apparatus 100 may set thresholds for the content priority in the inline method or the content priority in the post-process method. In this way, the load caused by the calculation of the priority can be reduced.

Note that the thresholds ($TH\_N_{all}$, $TH\_N_{inline}$, and $TH\_N_{post}$) are set by the administrator, operator or the like operating the management apparatus 172, for example. Moreover, for example, the thresholds may be previously stored in an initialization file or the like, and may be automatically read by the storage apparatus 100 at the start of the backup program 150 or the like.

Alternatively, the storage apparatus 100 may dynamically update the thresholds described above. In this case, for example, the storage apparatus 100 sets a large threshold $TH\_N_{inline}$ and a small threshold $TH\_N_{post}$ when a de-duplication rate of the data received from the host apparatus is high. In this way, the number of simultaneous processes in the inline method can be increased according to the de-duplication of the data received from the host apparatus. Thus, the backup process performance of the storage apparatus 100 can be improved.

For example, when the data received from the host apparatus is backup data of a second or later generation, the storage apparatus 100 may set a large threshold $TH\_N_{inline}$ for the number of simultaneous processes in the inline method, and set a small threshold $TH\_N_{post}$ for the number of simultaneous processes in the post-process method. The contents of the second or later generation are likely to overlap with the backup data of a previous generation. Thus, by processing more contents in the inline method, the backup process performance of the storage apparatus 100 can be improved.

Note that the above method is just an example of the method for calculating the thresholds ($TH\_N_{all}$, $TH\_N_{inline}$, and $TH\_N_{post}$). The method for calculating the thresholds is not limited thereto. The thresholds may be calculated based on other elements, or may be calculated by combining a plurality of elements.

As described above, in this embodiment, upon receipt of a data write request from the host apparatus, the storage apparatus 100 selects a de-duplication process method to be used for the received data based on at least any of the influence on the processing performance of the storage apparatus 100 to be caused by the inline de-duplication process, the influence on the processing performance of the storage apparatus 100 to be caused by the post-process de-duplication process, and the usage of the temporary storage device 106*b* to be required for execution of the post-process de-duplication process.

Thus, the data de-duplication process can be efficiently performed suitably combining the inline de-duplication process and the post-process de-duplication process while effectively utilizing the storage resources in consideration of the influence on the processing performance of the storage apparatus 100 and the usage of the temporary storage device 106*b*.

Moreover, the storage apparatus 100 increases or decreases at least any of the number of simultaneous processes in the inline de-duplication process and the number of simultaneous processes in the post-process de-duplication process, based on at least any of the influence on the processing performance of the storage apparatus 100 to be caused by simultaneous execution of inline de-duplication processes for a plurality of data received with the I/O request from the host apparatus, the influence on the processing performance of the storage apparatus 100 to be caused by simultaneous execution of post-process de-duplication processes for a plurality of data received with the I/O request from the host apparatus, and the utilization efficiency of the storage apparatus 100.

Therefore, for example, when data write to the temporary storage device 106*b* is frequently performed by the post-process de-duplication process, the number of simultaneous processes in the post-process de-duplication process is reduced, and the number of simultaneous processes in the inline de-duplication process is increased, thereby improving the processing performance of the backup process (de-duplication process).

Next, description is given of some other embodiments using the same basic configuration as that of the first embodiment described above.

Second Embodiment

In the first embodiment, in the post-process de-duplication process S305 in the backup process S300 shown in FIG. 7, the content is divided into chunks after the start of the post-process de-duplication process S305 (FIG. 10). However, when the post-process method is selected as the de-duplication method in the backup process S300 in FIG. 7, the content may be previously divided into chunks prior to the start of the post-process de-duplication process S305 performed at later timing. In this way, the division of the content into chunks is already completed when the time comes to start the post-process de-duplication process S305. Thus, the chunk de-duplication process (corresponding to S604 in FIG. 10) can be immediately started. As a result, the post-process de-duplication process S305 can be efficiently performed.

Figure 13:
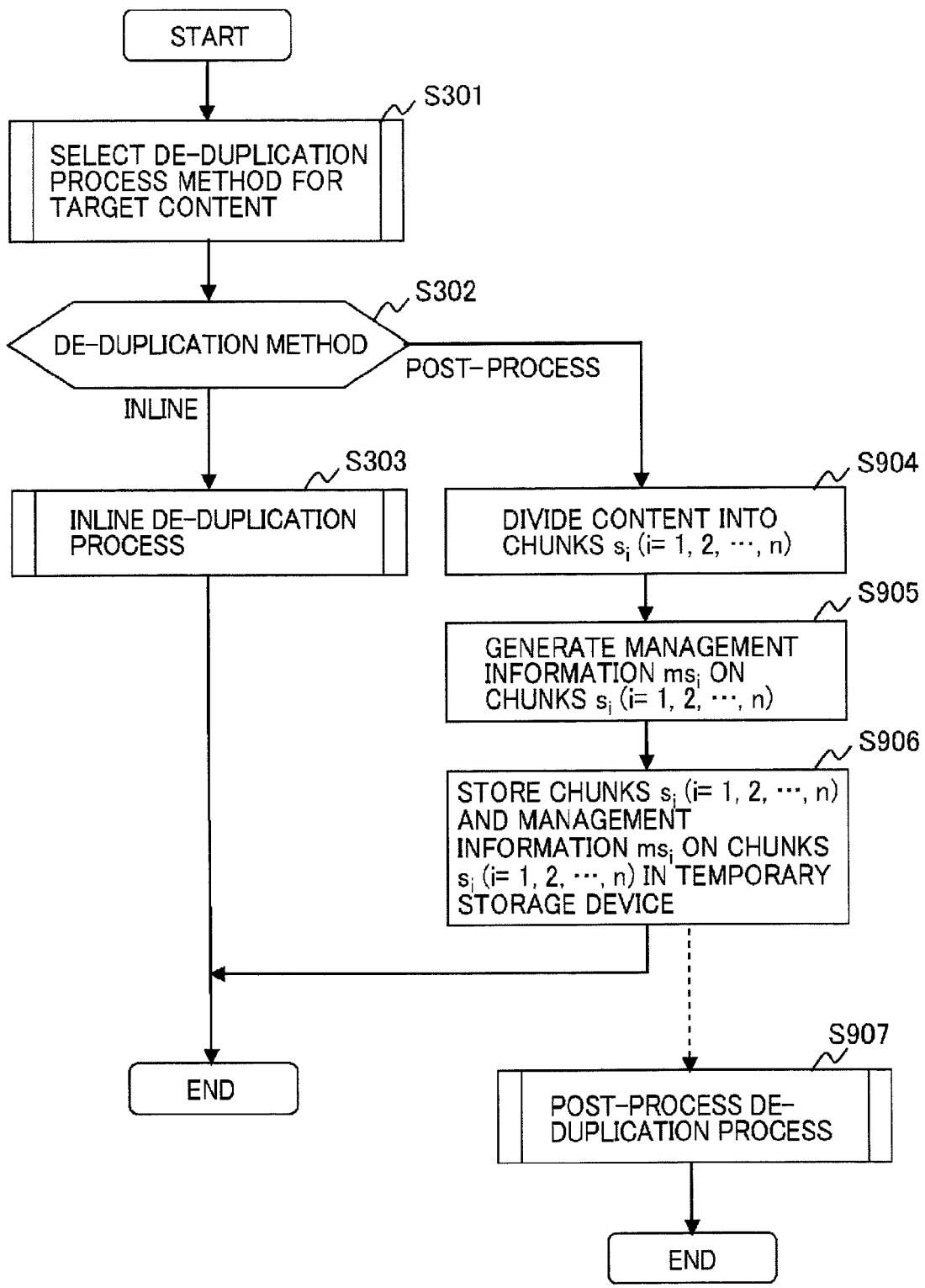
FIG. 13 is a flowchart showing the overall flow of a backup process S900 in a second embodiment.

FIG. 13 is a flowchart showing the overall flow of a backup process (hereinafter referred to as the backup process S900) to be described as a second embodiment, which is performed by the storage apparatus 100. Note that since processing S901 to S903 in FIG. 13 is the same as the processing S301 to S303 in FIG. 7 in the first embodiment, description thereof is omitted. Moreover, since S904 and S905, i.e., the processing of dividing the target content into chunks is the same as the processing S602 and S603 in FIG. 10 in the first embodiment, description thereof is omitted.

In S906, the storage apparatus 100 stores management information and the chunks generated by dividing the target content in the temporary storage device 106b.

In S907, the storage apparatus 100 reads the chunks and management information from the temporary storage device to perform the post-process de-duplication process.

Figure 14:
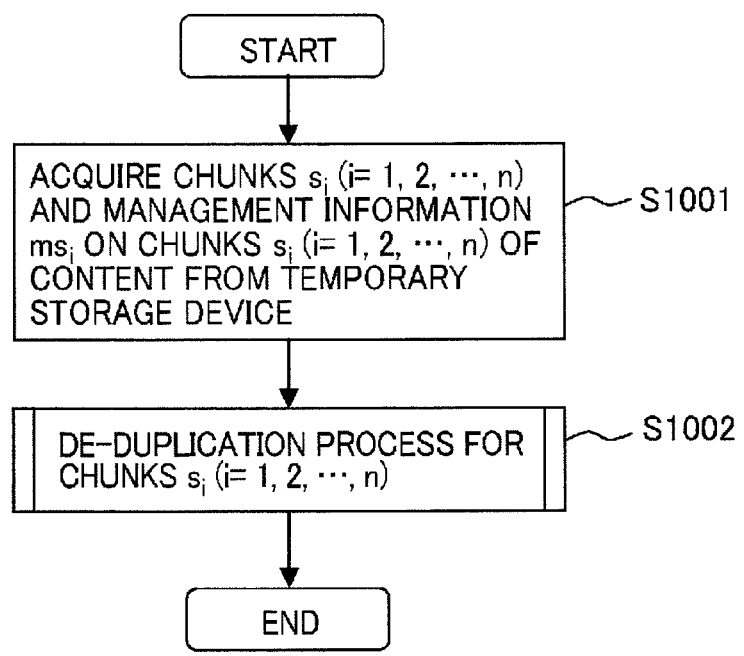
FIG. 14 is a flowchart showing a de-duplication process S907 in a post-process method.

FIG. 14 is a flowchart showing details of the de-duplication process S907 in FIG. 13 (hereinafter referred to as the post-process de-duplication process S907).

First, the storage apparatus 100 reads the chunks and management information from the temporary storage device 106b (S1001). Note that since the processing in S1002 is the same as the chunk de-duplication process S403 in FIG. 9 in the first embodiment, description thereof is omitted.

Figure 15:
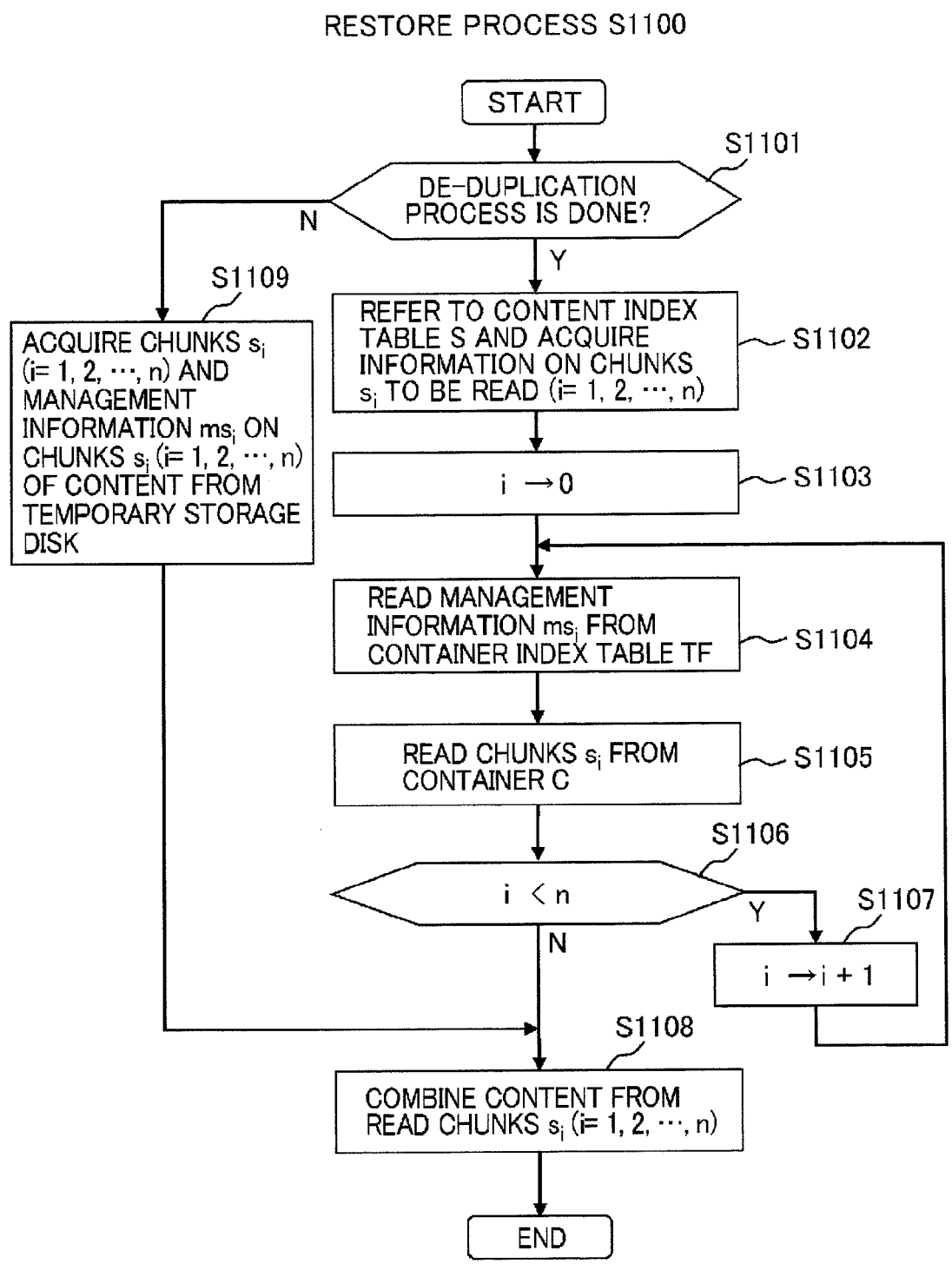
FIG. 15 is a flowchart showing a restore process S1100 in the second embodiment.

FIG. 15 is a flowchart showing a content restore process (hereinafter referred to as the restore process S1100) described as the second embodiment.

Since processing S1101 to S1108 in FIG. 15 is the same as the processing S701 to S708 in FIG. 11 in the first embodiment, description thereof is omitted.

In S1109, the storage apparatus 100 reads chunks and management information from the temporary storage device 106b. In S1108, the storage apparatus 100 restores the content from the chunks by using the read management information (S1108).

As described above, in the second embodiment, the chunks are generated by dividing the content upon receipt of the content with the I/O request from the host apparatus, and the generated chunks are stored in the temporary storage device 106b. Thus, the post-process de-duplication process at a later timing can be readily and efficiently performed. Moreover, the processing for the generation of chunks and the duplication determination process can be separated in terms of time.

Third Embodiment

In a third embodiment, in order to reduce the usage of the temporary storage device 106b, the content is compressed and written into the temporary storage device 106b at a selected timing when the post-process method is selected as the de-duplication method in the backup process S300 in FIG. 7 in the first embodiment. Thus, the usage of the temporary storage device 106b is reduced.

Figure 16:
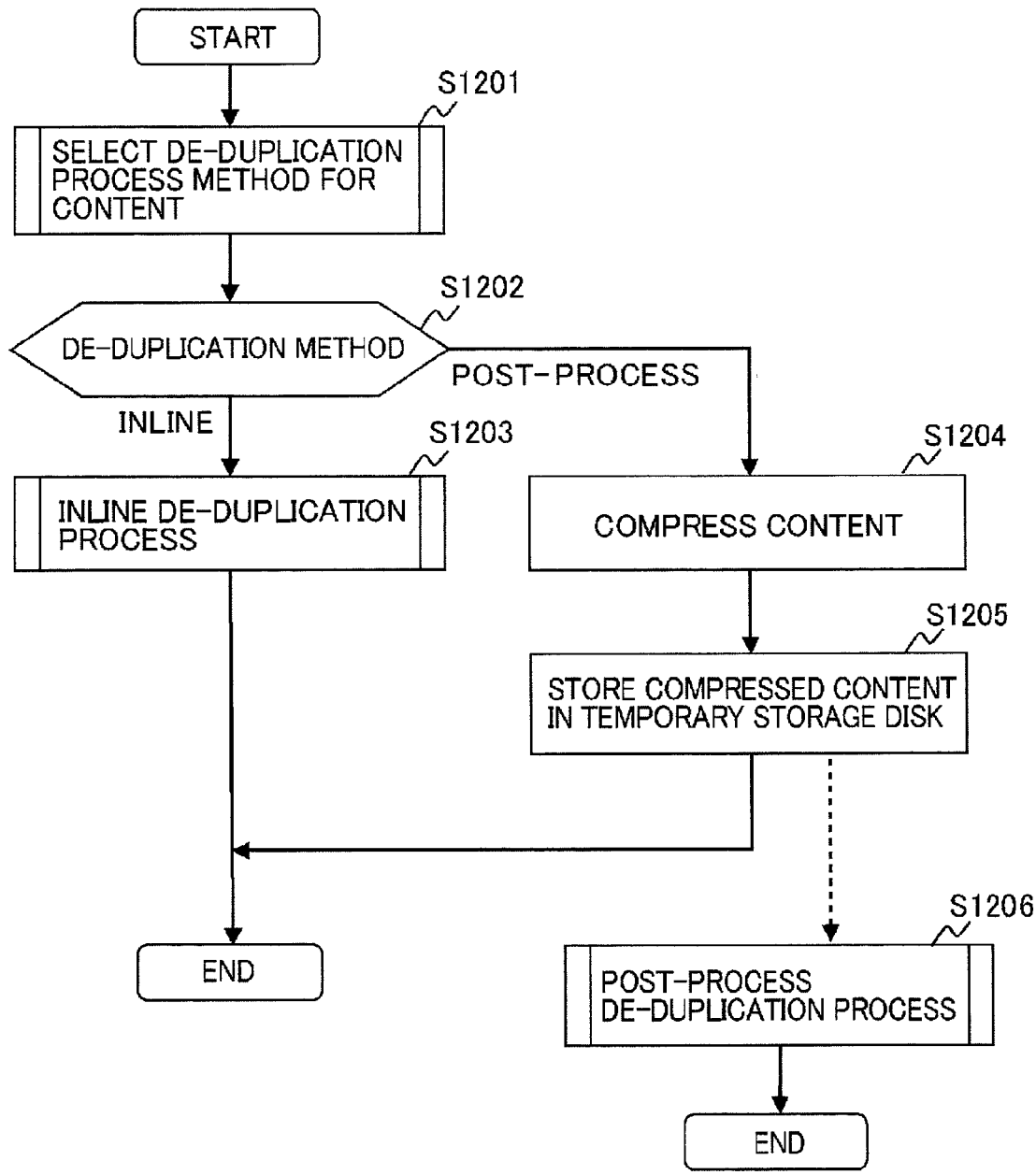
FIG. 16 is a flowchart showing the overall flow of a backup process S1200 in a third embodiment.

FIG. 16 is a flowchart showing the overall flow of a backup process (hereinafter referred to as the backup process S1200) to be described as the third embodiment, which is performed by the storage apparatus 100. Note that since processing S1201 to S1203 in FIG. 16 is the same as the processing S301 to S303 in FIG. 7 in the first embodiment, description thereof is omitted.

In S1204, the storage apparatus 100 compresses the target content using a suitable compression algorithm. In S1205, the storage apparatus 100 writes the compressed target content into the temporary storage device 106b (S1205). Thereafter, in S1206, the storage apparatus 100 performs the post-process de-duplication process at a later timing.

Figure 17:
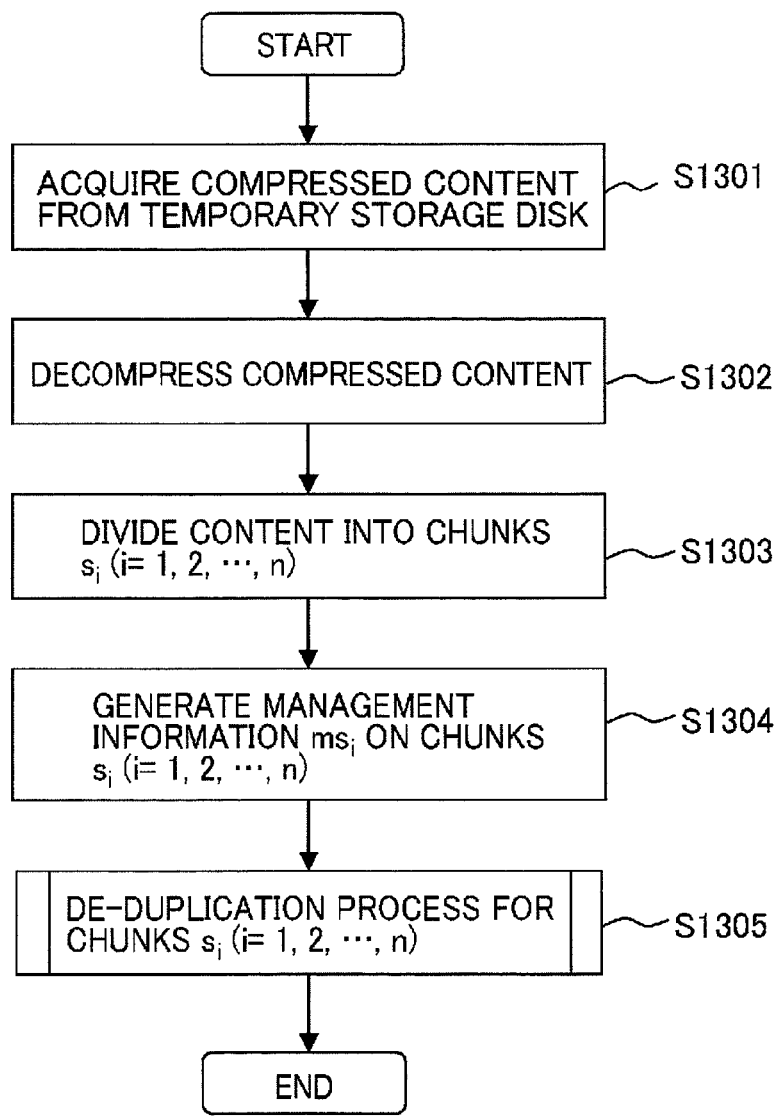
FIG. 17 is a flowchart showing details of a de-duplication process S1206 in a post-process method.

FIG. 17 is a flowchart showing details of the post-process de-duplication process S1206 at a later timing.

First, the storage apparatus 100 reads the compressed and stored content from the temporary storage device 106b (S1301), and decompresses the read content (S1302).

Note that since processing S1303 to S1305 is the same as the processing S602 to S604 in FIG. 10 in the first embodiment, description thereof is omitted.

Figure 18:
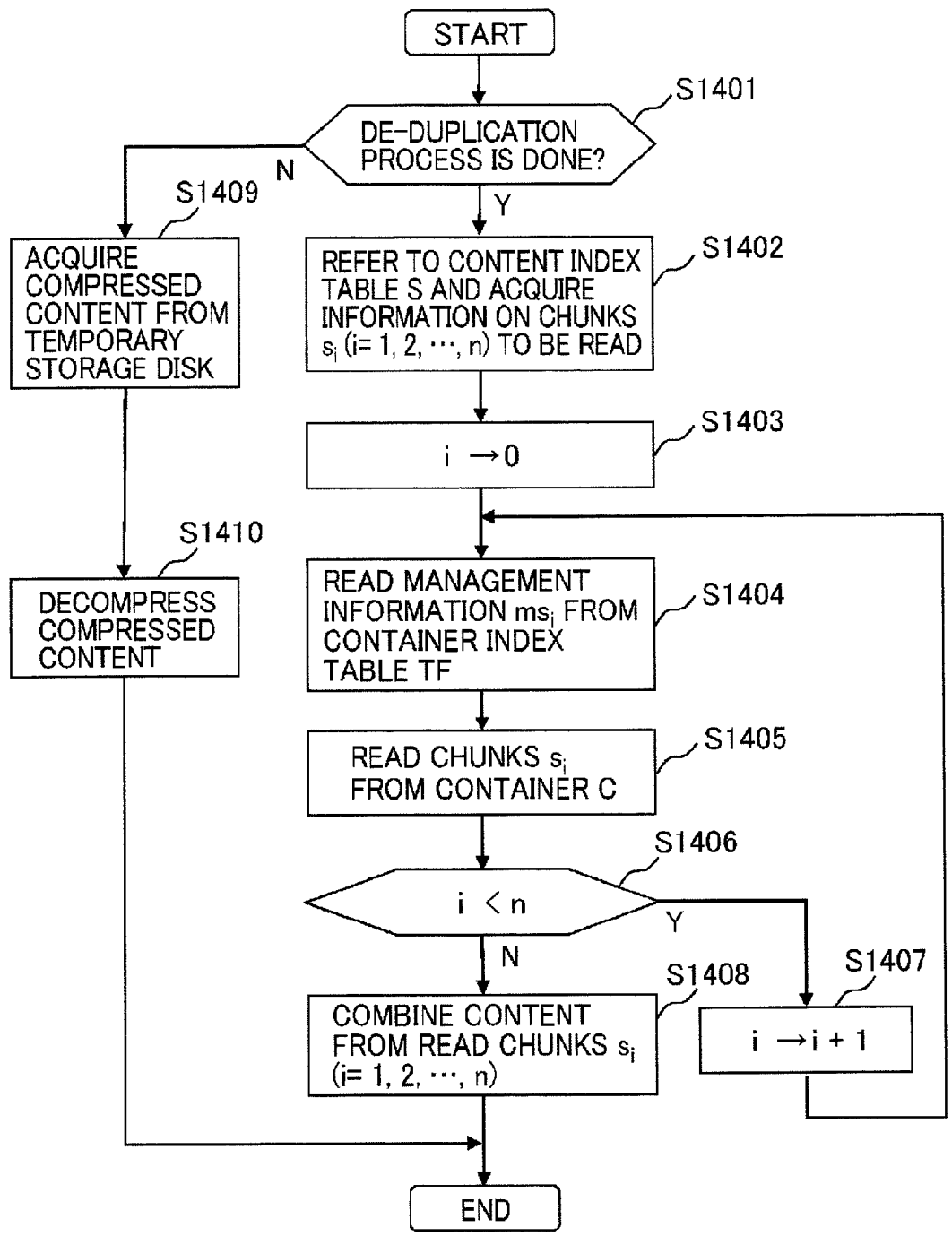
FIG. 18 is a flowchart showing a restore process S1400 in the third embodiment.

FIG. 18 is a flowchart showing a restore process (hereinafter referred to as the restore process S1400) to be described as the third embodiment. Note that since processing S1401 and S1402 in FIG. 18 is the same as the processing S701 to S708 in FIG. 11 in the first embodiment, description thereof is omitted.

In S1409, the storage apparatus 100 reads the compressed content from the temporary storage device 106b (S1409). Then, in S1410, the storage apparatus 100 decompresses the read content to the original content (S1410).

Note that although the compression process is performed for the content to be written into the temporary storage device 106b, the content may be divided into chunks and then the generated chunks may be compressed.

As described above, in the third embodiment, the content received with the I/O request from the host apparatus is compressed and stored in the temporary storage device 106b. Thus, the usage of the temporary storage device 106b can be reduced.

Fourth Embodiment

In a fourth embodiment, for execution of the de-duplication process using the post-process method for the content received from the host apparatus, de-duplication between the received content and a universal chunk is performed before the received content is written into the temporary storage device 106b, thereby reducing the usage of the temporary storage device 106b.

Figure 19:
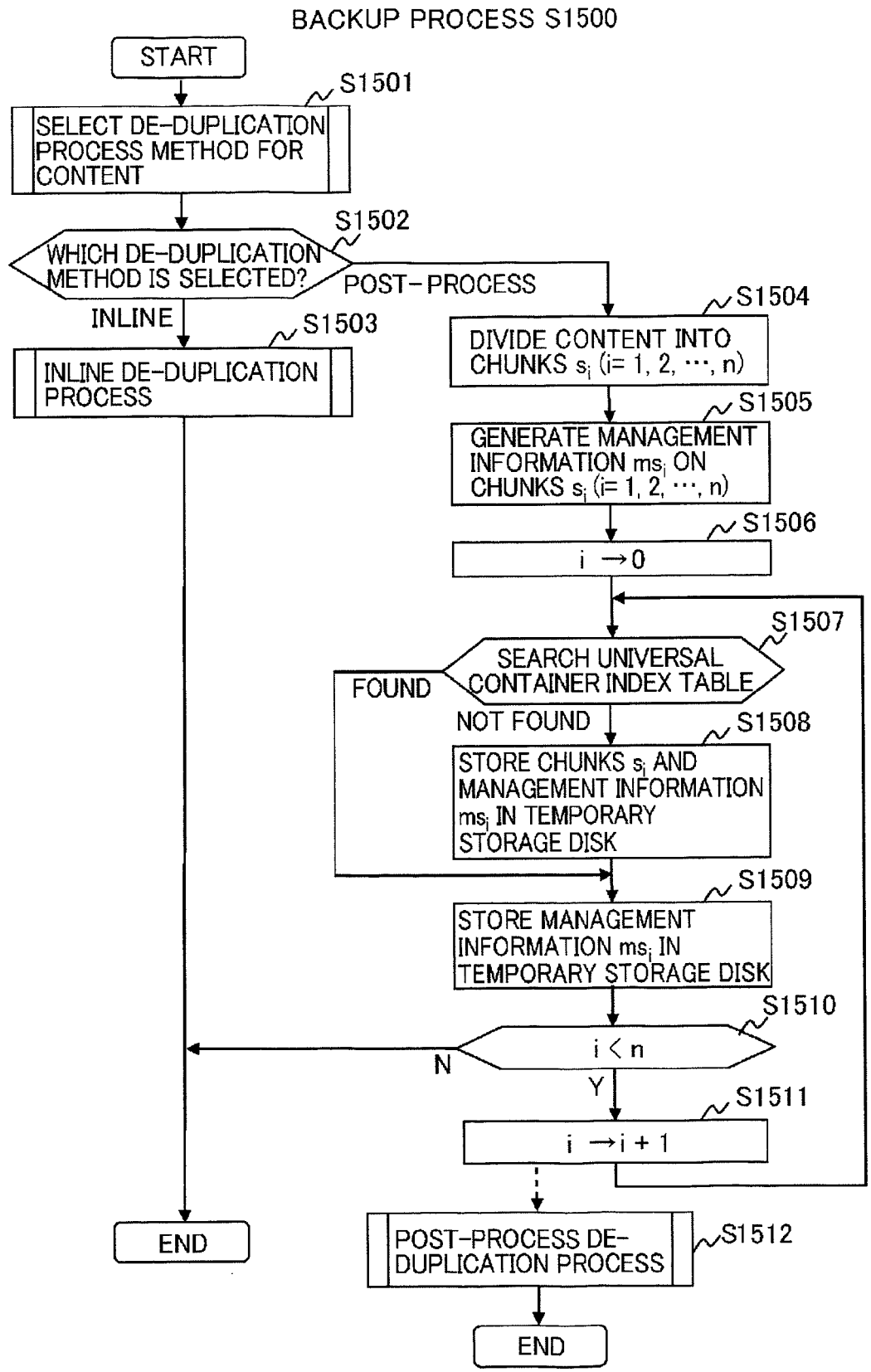
FIG. 19 is a flowchart showing the overall flow of a backup process S1500 in a fourth embodiment.

FIG. 19 is a flowchart showing the overall flow of a backup process (hereinafter referred to as the backup process S1500) to be described as the fourth embodiment, which is performed by the storage apparatus 100. Note that since processing S1501 to S1503 in FIG. 19 is the same as the processing S301 to S303 in FIG. 7 in the first embodiment, description thereof is omitted.

In S1504, the storage apparatus 100 divides the content into chunks (S1504), and generates management information.

Then, the storage apparatus 100 resets a counter i (i=0) to be used for a subsequent loop process, and starts de-duplication determination on each chunk (S1506).

In S1507, the storage apparatus 100 searches the universal container index table Tc 128 in the memory 104, and determines whether or not there is a chunk having the same data as a chunk to be currently processed (hereinafter referred to as the target chunk) in the storage device 106a (S1507). When the chunk having the same data as the target chunk is present in the storage device 106a (S1507: Found), the storage apparatus 100 performs processing from S1509.

On the other hand, when the chunk having the same data as the target chunk is not present in the storage device 106a (S1507: Not found), the storage apparatus 100 writes the target chunk and management information thereon into the temporary storage device 106b (S1508), and then performs processing from S1509.

In S1509, the storage apparatus 100 writes information about division of the chunks and the management information into the temporary storage device 106b. Note that the management information written here also includes information indicating whether or not it is determined in S1507 that the chunk having the same data is present in the storage device 106a.

In S1510, the storage apparatus 100 determines whether or not the processing of all the chunks is completed. To be more specific, the storage apparatus 100 performs this determination by comparing the number n of the chunks generated by dividing the content with the value of the counter i. When the processing of all the chunks is completed (S1510: N), the storage apparatus 100 terminates the backup process S1500. On the other hand, when the processing of all the chunks is not completed (S1510: Y), the storage apparatus 100 adds 1 to the counter i (S1511), and then performs processing from S1507. S1512 is the post-process de-duplication process S1512 performed at a later timing.

Figure 20:
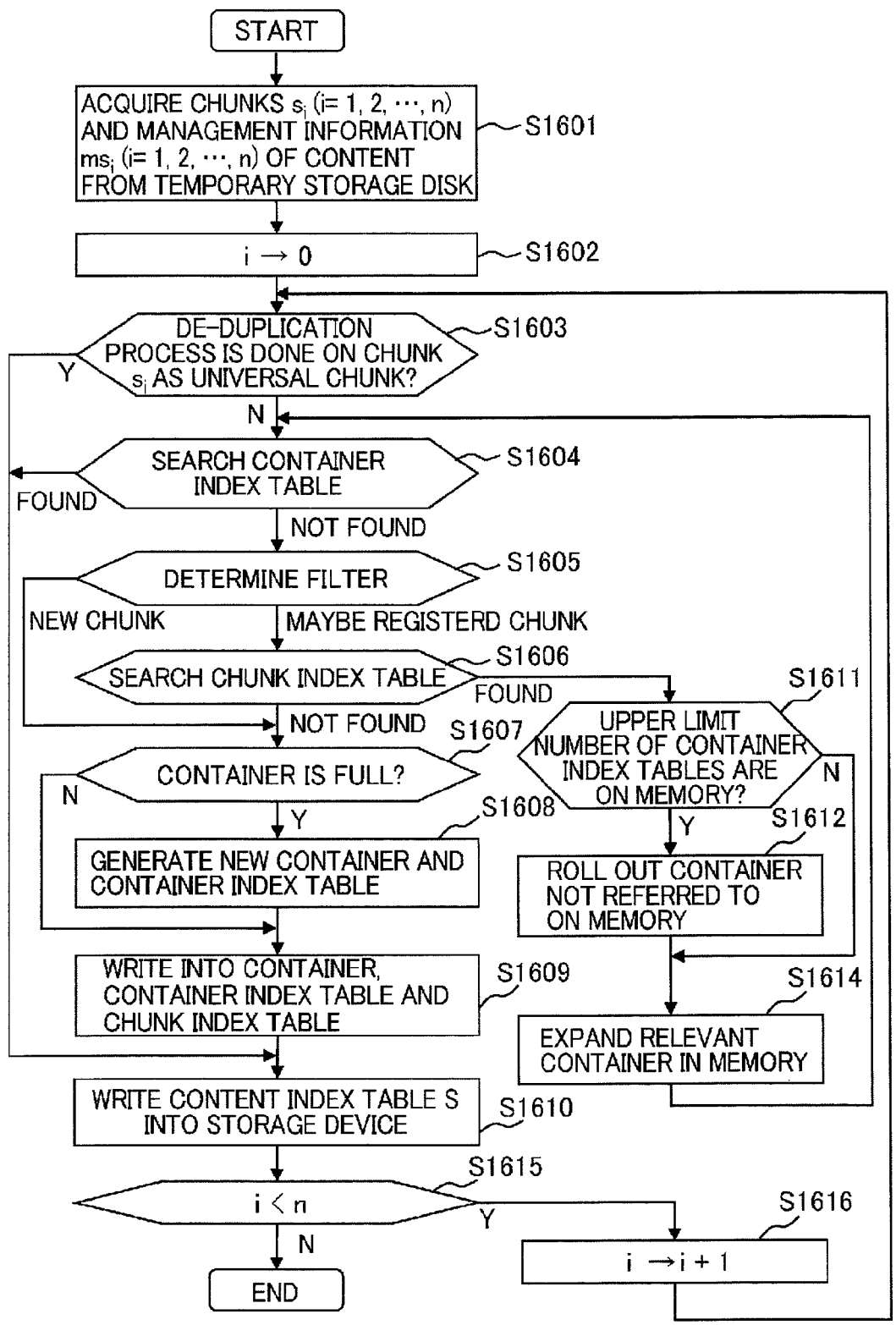
FIG. 20 is a flowchart showing details of a de-duplication process S1512 in a post-process method.

FIG. 20 is a flowchart showing details of the post-process de-duplication process S1512.

First, the storage apparatus 100 acquires chunks and management information from the temporary storage device 106b (S1601).

Next, the storage apparatus 100 resets a counter i (i=0) to be used in a subsequent loop process (S1602).

In S1603, the storage apparatus 100 determines, referring to the management information, whether or not it is determined in S1507 in FIG. 19 that, in the storage device 106a, there is a chunk having the same data as the chunk (hereinafter referred to as the target chunk) acquired in S1601. When it is determined that the chunk having the same data as the target chunk is not present in the storage device 106a (S1603: N), the storage apparatus 100 performs processing from S1604.

On the other hand, when it is determined that the chunk having the same data as the target chunk is present in the storage device 106a (S1603: Y), the storage apparatus 100 writes information on the target chunk into the content index table S164 (S1610).

Note that since processing S1604 to S1616 is the same as the processing S503 to S512 in FIG. 9 in the first embodiment, detailed description thereof is omitted.

Figure 21:
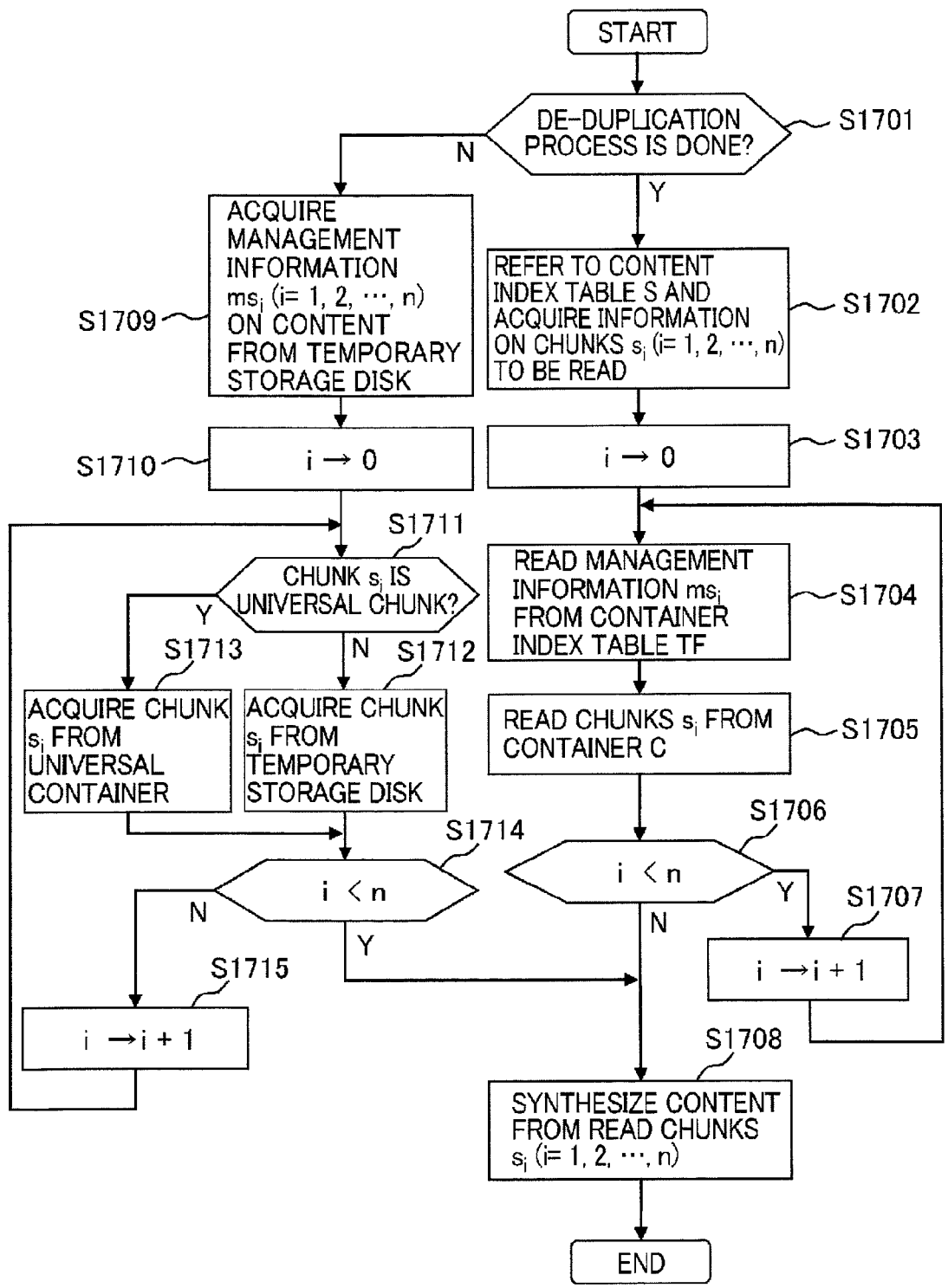
FIG. 21 is a flowchart showing a restore process S1700 in the fourth embodiment.

FIG. 21 is a flowchart showing a content restore process (hereinafter referred to as the restore process S1700) described as the fourth embodiment. Note that since processing S1701 to S1708 in FIG. 21 is the same as the processing S701 to S708 in FIG. 11 in the first embodiment, description thereof is omitted.

In S1709, the storage apparatus 100 reads management information on the target content from the temporary storage device 106b. Then, in S1710, the storage apparatus 100 resets a counter i (i=0) to be used in a subsequent loop process.

In S1711, the storage apparatus 100 determines, referring to the management information, whether or not it is determined in S1507 in FIG. 19 that, in the storage device 106a, there is a chunk having the same data as the chunk (hereinafter referred to as the target chunk) to be currently processed. When it is determined that the chunk having the same data as the target chunk is not present in the storage device 106a (S1711: N), the storage apparatus 100 reads chunks (entity data) from the temporary storage device 106b (S1712).

On the other hand, when it is determined that the chunk having the same data as the target chunk is present in the storage device 106a (S1711: Y), the storage apparatus 100 reads chunks (entity data on the chunks) from the universal container Cc expanded in the memory 104 (S1713).

In S1714, the storage apparatus 100 compares the number of chunks included in the target content with the counter number of the counter i to determine whether or not reading of all the chunks included in the content to be restored is completed. When the reading of all the chunks included in the content to be restored is completed (S1714: Y), the storage apparatus 100 performs processing from S1708. On the other hand, when the reading of all the chunks included in the content to be restored is not completed (S1714: N), the storage apparatus 100 adds 1 to the counter i (S1715), and then performs processing from S1711.

Note that, in the above embodiment, for the content to which the post-process method is applied, only the de-duplication process related to the universal chunk is performed before the write into the temporary storage device 106b. However, other kinds of de-duplication process may be performed in addition thereto.

As described above, in the fourth embodiment, the de-duplication process between the content received from the host apparatus and the universal chunk is performed before the received content is written into the temporary storage device 106b. Moreover, chunks overlapping with the universal chunk are not written into the temporary storage device 106. Thus, the duplication determination process can be efficiently performed, and the usage of the temporary storage device 106b can be reduced. Note that the duplication determination process can be quickly performed by storing the universal container Cc in the memory 104, thus improving the processing performance.

While the embodiments have been described above, the embodiments are intended to facilitate the understanding of the present invention and not to limit the invention. The present invention can be changed and modified without departing from the scope of the invention, and also includes equivalents thereof.

The invention claimed is:

1. A storage apparatus comprising:
    a storage device configured to provide storage area for storing data sent from an external apparatus,
    a memory configured to store information used for an I/O request to the storage device from the external apparatus, and
    a processor configured to control the I/O request and
    to perform a first de-duplication process on data corresponding to the I/O request sent from the external apparatus prior to the data being stored in the storage device and
    a second de-duplication process on data that has been already stored in a predetermined storage area of the storage device after receiving from the external apparatus,
    wherein, upon receipt of the I/O request to target data, the processor is configured to selects one of the first or the second de-duplication processes to be applied to the target data based on at least one of information related to a probability of de-duplication of the target data and information related to a capacity of the predetermined storage area in the storage device,
    wherein the processor is configured to perform two or more de-duplication processes on two or more respective target data in parallel, in which the two or more de-duplication processes correspond to one of the first and the second de-duplication processes respectively,
    wherein the processor is configured to manage a total number of the two or more de-duplication processes performed in parallel based on at least one of information related to access frequency to the predetermined storage area in the storage device and information related to utilization efficiency of the predetermined storage area in the storage device.

2. The storage apparatus according to claim 1,
wherein the processor is configured to provide a file system,
wherein the processor is configured to manage an index of the probability of de-duplication of the target data which is used to select one of the first or the second de-duplication process, on a file basis,
wherein the index is configured to indicate that the first de-duplication process is likely to be selected if at least the part of the file name of the target file matches at least a part of file name of one or more files which have already been stored in the storage device.

3. The storage apparatus according to claim 1,
wherein the processor is configured manage an index of the probability of de-duplication of the target data which is used to select one of the first or the second de-duplication process
wherein the processor is configured to perform de-duplication process on a part of the target data by comparing the part of the target data and data which has been already stored in the storage device and to determine a de-duplication rate of the part of the target data,
wherein the index is configured to indicate that the first de-duplication process is likely to be selected if the de-duplication rate is higher than a predetermined threshold.

4. The storage apparatus according to claim 1,
wherein the processor is configured to manage an index of the probability of de-duplication of the target data which is used to select one of the first or the second de-duplication process,
wherein the index is configured to indicate that the first de-duplication process likely to be selected, if the target data corresponds to a second or later generation of backup data.

5. The storage apparatus according to claim 1,
wherein the processor is configured to manage an index of the probability of de-duplication of the target data which is used to select one of the first or the second de-duplication process,
wherein the index is configured to indicate that the first de-duplication process is likely to be selected if a size of the target data is larger than a predetermined threshold.

6. The storage apparatus according to claim 1,
wherein, upon selecting one of the first or the second de-duplication process, the processor is configured to determines whether or not a total capacity of an used capacity of the predetermined storage area and a capacity of the target data exceeds a predetermined threshold,
wherein, if the total capacity of the used capacity of the predetermined storage area and the capacity of the target data exceeds the predetermined threshold, the processor is configured to select the first de-duplication process.

7. The storage apparatus according to claim 1,
wherein the processor is configured to increase or decrease at least one of a number of the first de-duplication processes and a number of the second de-duplication processes performed in parallel.

8. The storage apparatus according to claim 7,
wherein the processor is further configured to adjust the number of the first de-duplication processes and the number of the second de-duplication processes performed in parallel so that a total capacity of target data corresponding to the first de-duplication processes is approximately equal to a total capacity of target data corresponding to the second de-duplication processes.

9. The storage apparatus according to claim 7,
wherein, if a write access frequency to the predetermined storage area of the storage device is higher than a predetermined threshold, the processor is configured to increase the number of the first de-duplication processes and to decrease the number of the second de-duplication processes performed in parallel.

10. The storage apparatus according to claim 7,
wherein, if a load of a network between the storage apparatus and the external apparatus is higher than a predetermined threshold, the processor is configured to increase the number of the second de-duplication processes and to decrease the number of the first de-duplication processes performed in parallel.

11. The storage apparatus according to claim 1,
wherein, prior to the second de-duplication process, the processor is configured to
divide the target data into plurality of chunks and stores the plurality of chunks in the predetermined storage area, separately from the second de-duplication process.

12. The storage apparatus according to claim 1,
wherein, prior to the second de-duplication process, the processor is configured to compress the target data and to store the compressed data in the predetermined storage area, separately from the second de-duplication process,
wherein, in the second de-duplication process, the processor is configured to uncompress the compressed data stored in the predetermined storage area.

13. The storage apparatus according to claim 1,
wherein, prior to the second de-duplication process, the processor is configured to
divide the target data into a plurality of chunks
wherein the processor is configured to determine whether any of the plurality of chunks corresponding to the target data matches an universal chunk that is commonly included in a plurality of backup data over multiple backup generations,
wherein, if a result of the determination is positive, the processor does not store the specified chunk in the predetermined storage area.

14. The storage apparatus according to claim 1,
wherein, subsequently to storing the target in the predetermined storage area of the storage device, the processor is configured to start the second de-duplication process at a certain time to meet a predetermined requirement of performance and efficiency of the storage apparatus.

15. The storage apparatus according to claim 1,
wherein, if the total number of the two or more de-duplication processes performed in parallel exceeds a predetermined threshold, the processor is configured to suspend to start new de-duplication process.

16. The storage apparatus according to claim 1,
wherein the processor is configured to start managing the total number of the two or more de-duplication processes performed in parallel, at a time to start or finish one of the de-duplication processes.

17. The storage apparatus according to claim 1,
wherein the processor is configured to start managing the total number of the two or more de-duplication processes performed in parallel, in response to receive the target data from the external apparatus.

18. The storage apparatus according to claim 1,
wherein the processor is configured to start managing the total number of the two or more de-duplication processes performed in parallel, if the processor detects data in the predetermined storage area of the storage device, on which has not been performed the second de-duplication process.

19. A method for storage apparatus comprising:
controlling an I/O request from an external apparatus to a storage device;
performing a first de-duplication process on data corresponding to the I/O request sent from the external apparatus prior to the data being stored in the storage device and a second de-duplication process on data that has been already stored in a predetermined storage area of the storage device after receiving from the external apparatus;
upon receipt of the I/O request to target data, selecting one of the first or the second de-duplication processes to be applied to the target data based on at least one of information related to a probability of de-duplication of the target data and information related to capacity of the predetermined storage area in the storage device,
performing two or more de-duplication processes on two or more respective target data in parallel, in which the two or more de-duplication processes correspond to one of the first and the second de-duplication processes respectively,
managing a total number of the two or more de-duplication processes performed in parallel based on at least one of information related to access frequency to the predetermined storage area in the storage device and information related to utilization efficiency of the predetermined storage area in the storage device.

20. A computer program product for processing data, the computer program product being embodied in a non-transitory storage apparatus readable medium and comprising computer instructions for:
controlling an I/O request from an external apparatus to a storage device;
performing a first de-duplication process on data corresponding to the I/O request sent from the external apparatus prior to the data being stored in the storage device and a second de-duplication process on data that has been already stored in a predetermined storage area of the storage device after receiving from the external apparatus;
upon receipt of the I/O request to target data, selecting one of the first or the second de-duplication processes to be applied to the target data based on at least one of information related to a probability of de-duplication of the target data and information related to capacity of the predetermined storage area in the storage device,
performing two or more de-duplication processes on two or more respective target data in parallel, in which the two or more de-duplication processes correspond to one of the first and the second de-duplication processes respectively,
managing a total number of the two or more de-duplication processes performed in parallel based on at least one of information related to access frequency to the predetermined storage area in the storage device and information related to utilization efficiency of the predetermined storage area in the storage device.

* * * * *